April 2, 1946. K. B. W. KIEL 2,397,745
ADDING MACHINE
Original Filed Aug. 12, 1938 12 Sheets-Sheet 2

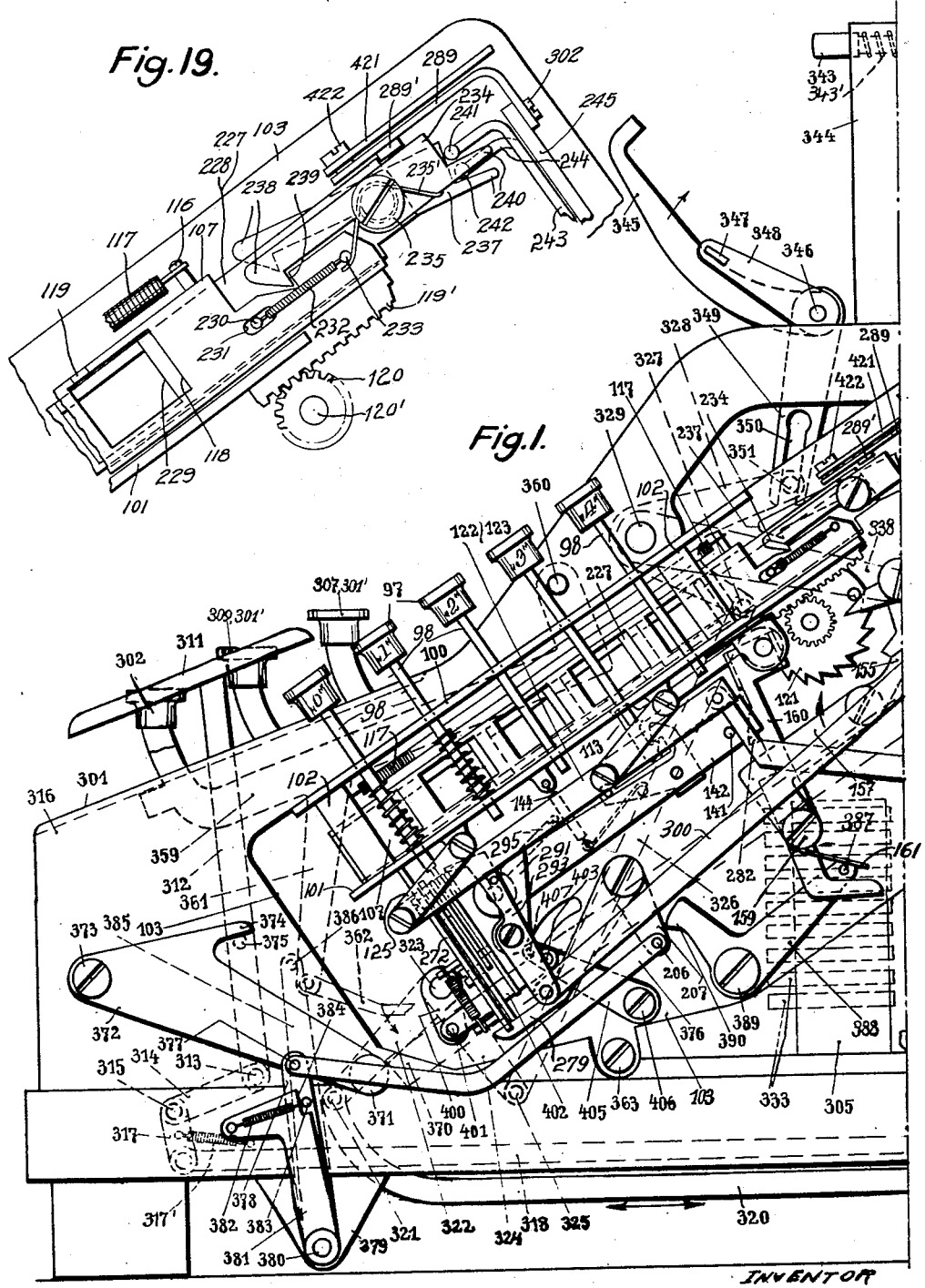

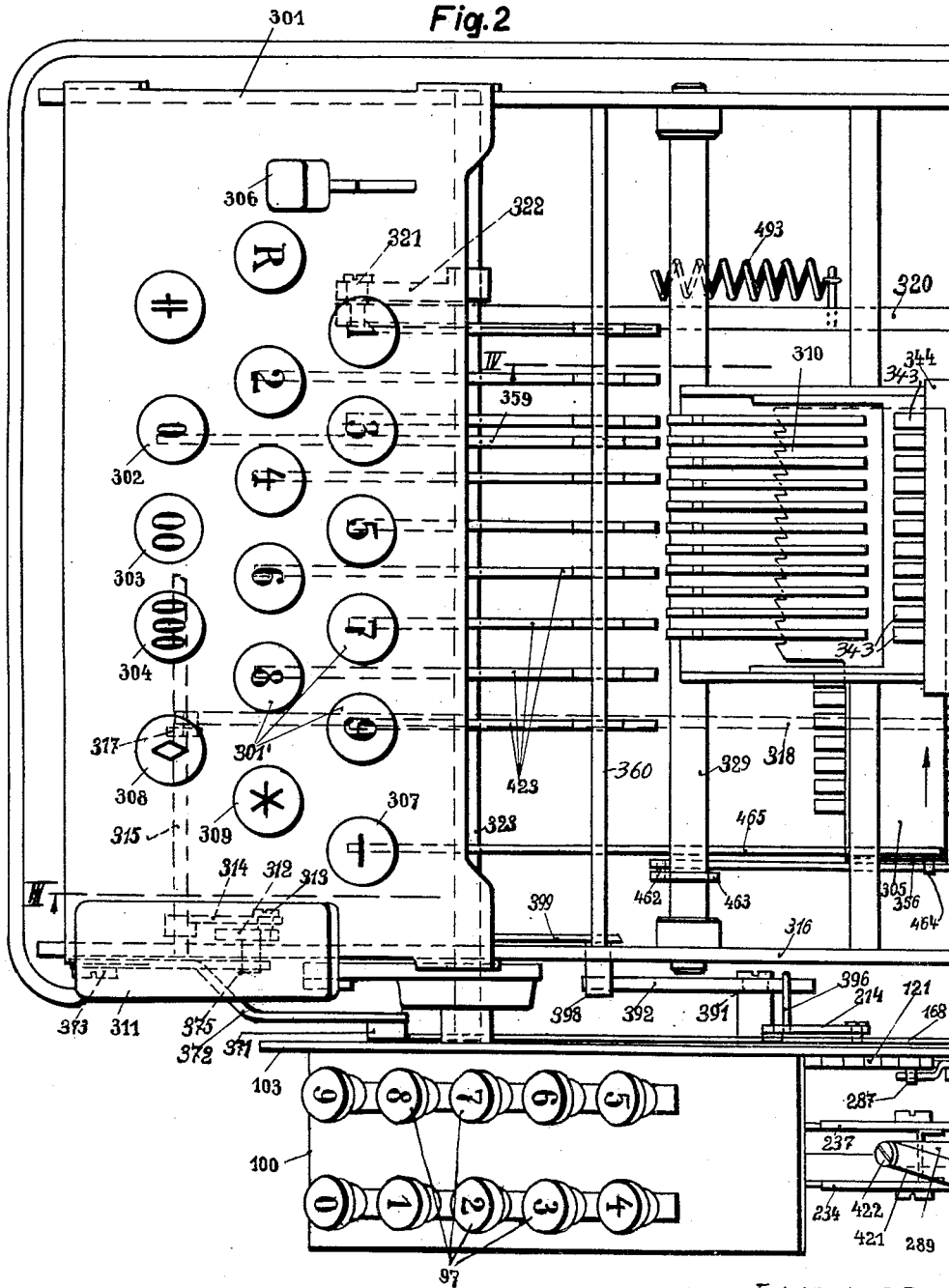

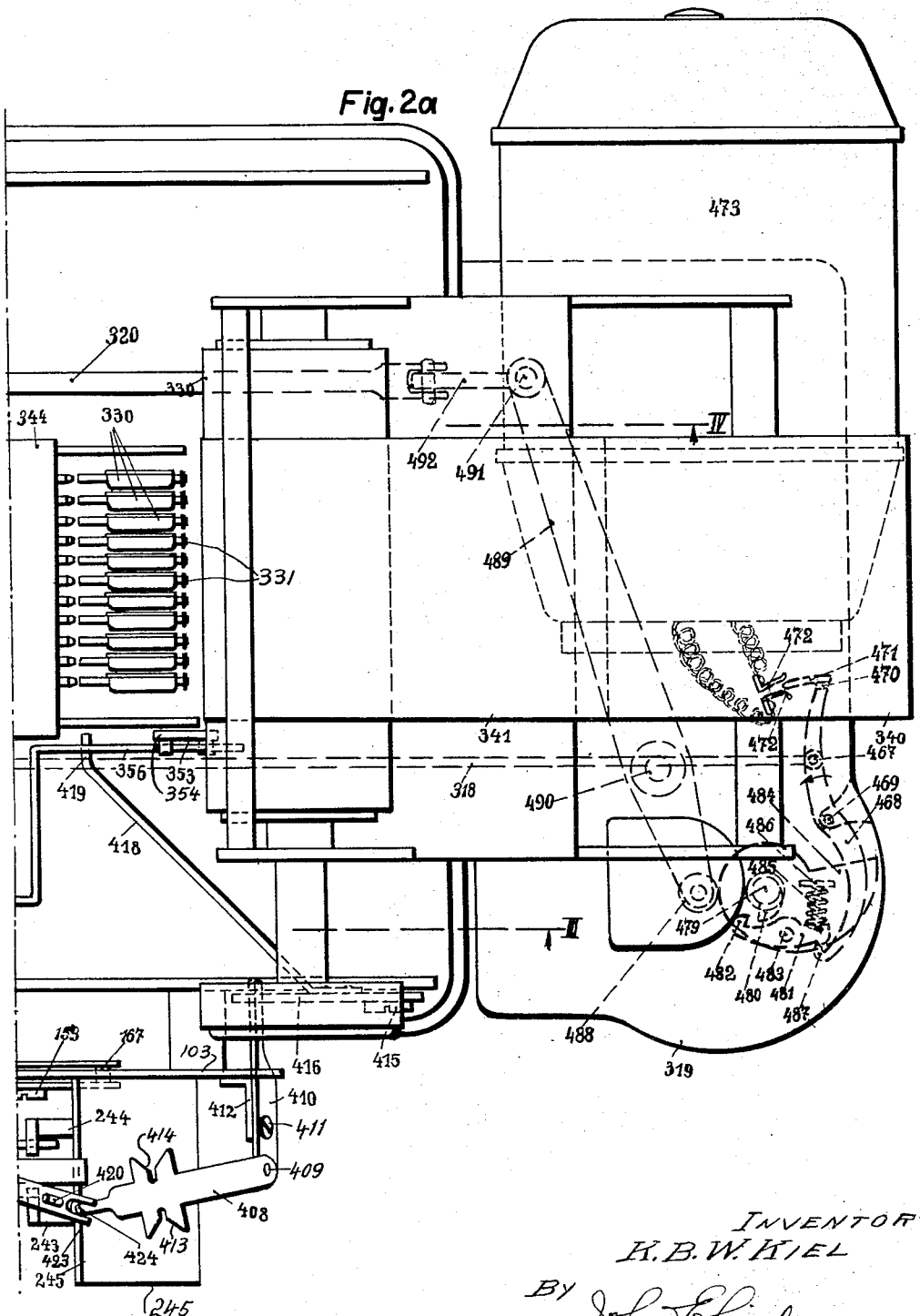

April 2, 1946. K. B. W. KIEL 2,397,745
ADDING MACHINE
Original Filed Aug. 12, 1938 12 Sheets-Sheet 5

INVENTOR
K.B.W. KIEL
By John C Lind
ATTORNEY

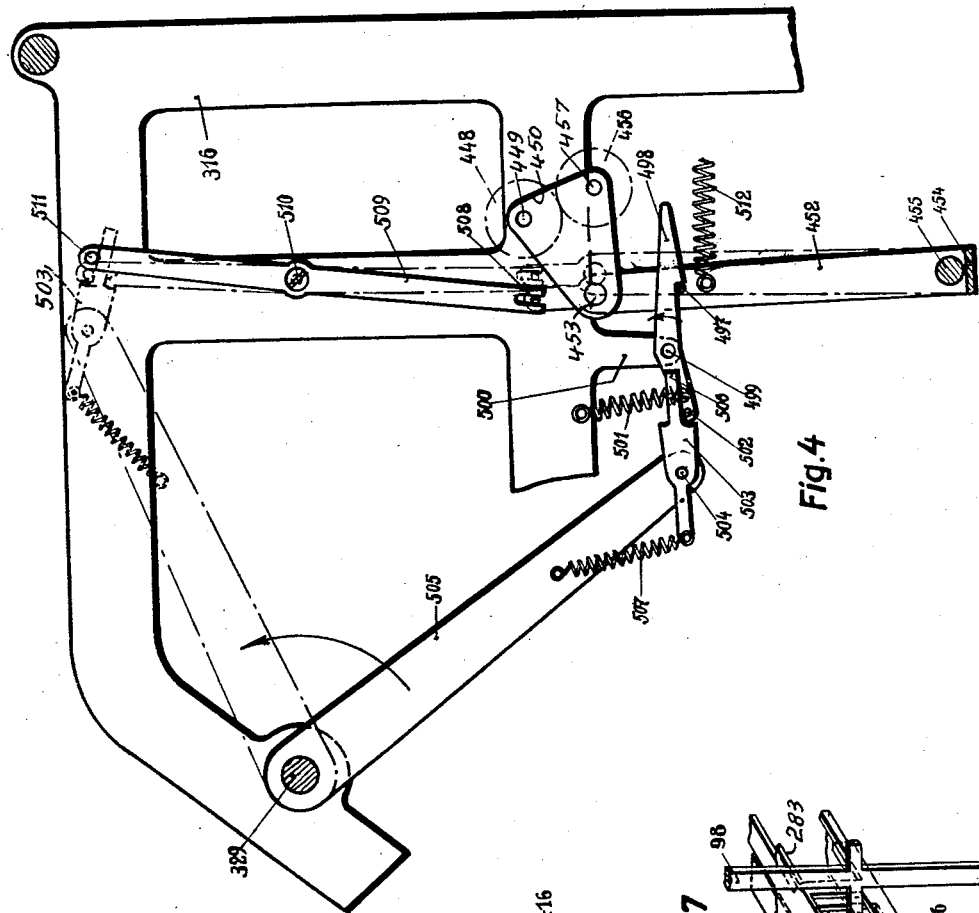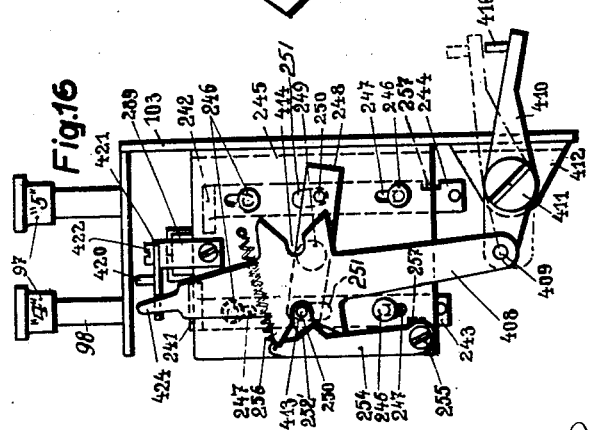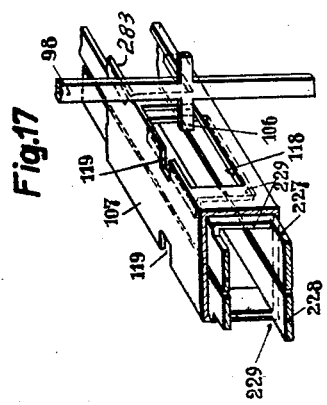

April 2, 1946.　　　　K. B. W. KIEL　　　　2,397,745
ADDING MACHINE
Original Filed Aug. 12, 1938　　12 Sheets-Sheet 7
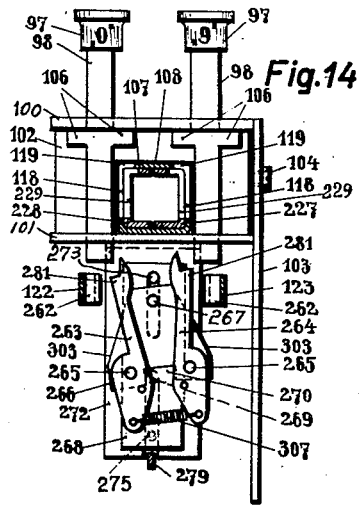
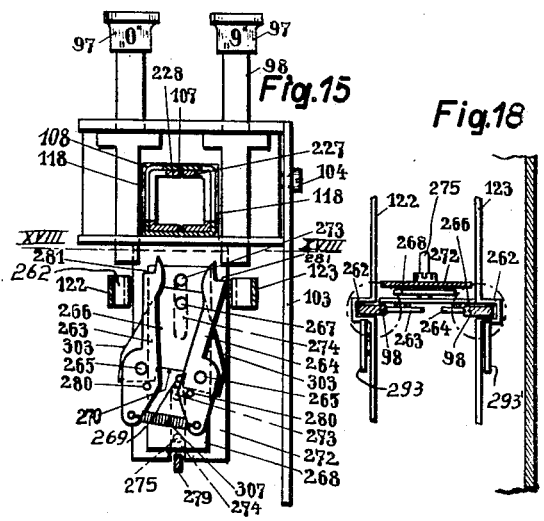
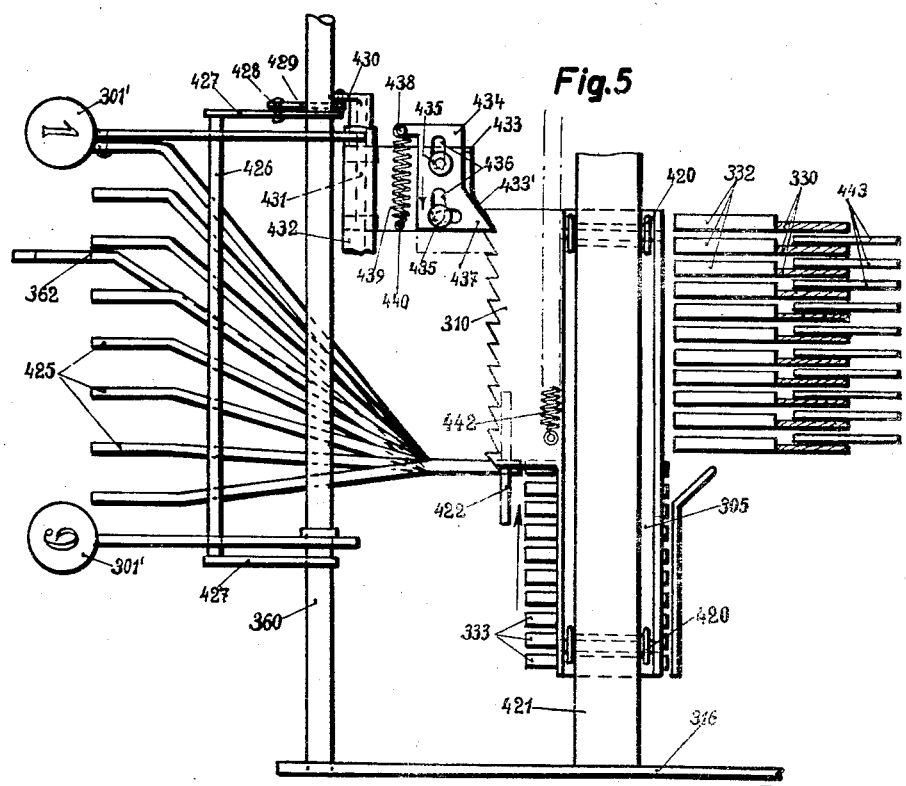
INVENTOR
K. B. W. KIEL
BY
John Ehrlich
ATTORNEY April 2, 1946. K. B. W. KIEL 2,397,745
ADDING MACHINE
Original Filed Aug. 12, 1938 12 Sheets-Sheet 8

INVENTOR
K.B.W.KIEL
BY John Oluid
ATTORNEY

April 2, 1946.  K. B. W. KIEL  2,397,745
ADDING MACHINE
Original Filed Aug. 12, 1938   12 Sheets-Sheet 9

INVENTOR
K. B. W. KIEL
ATTORNEY

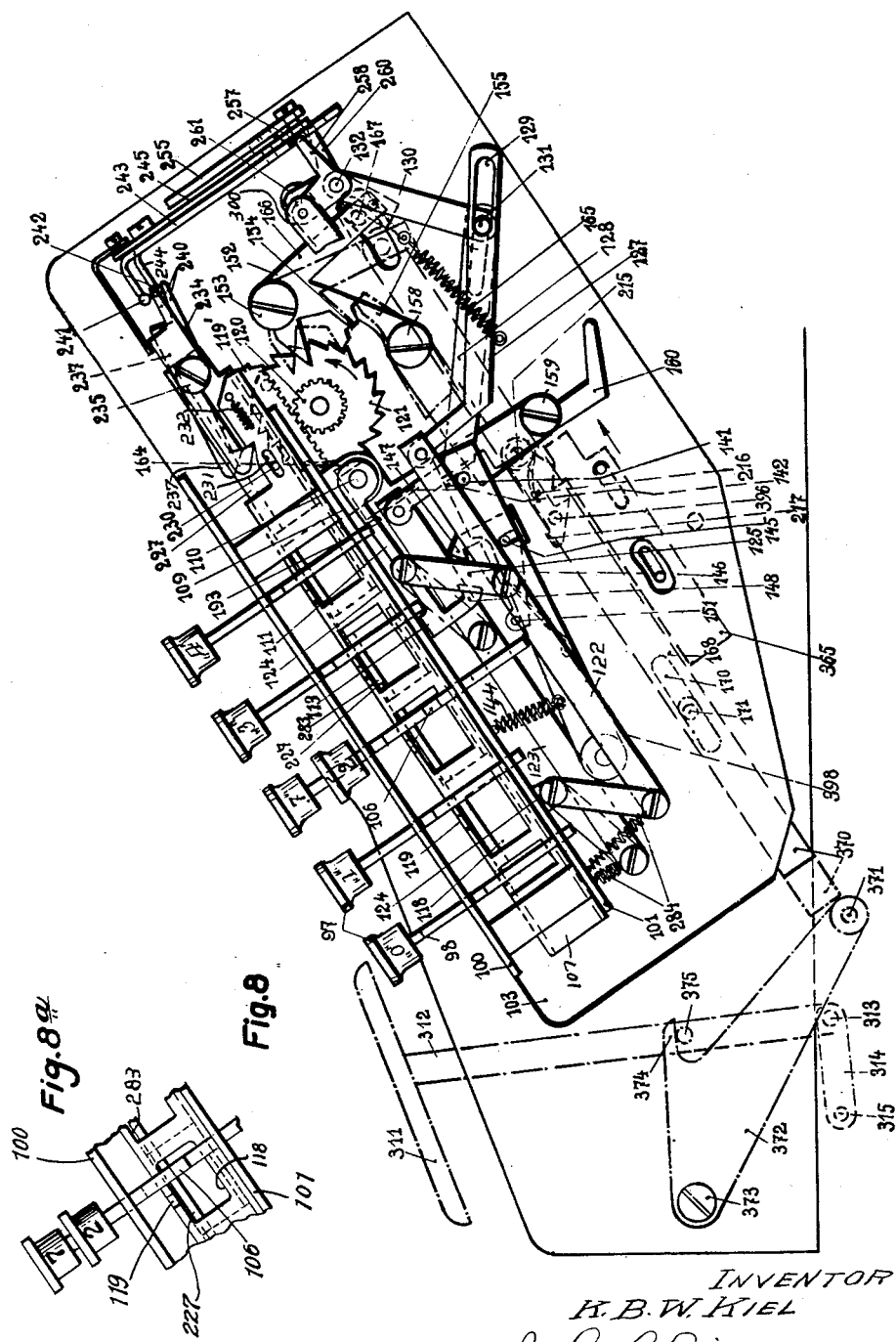

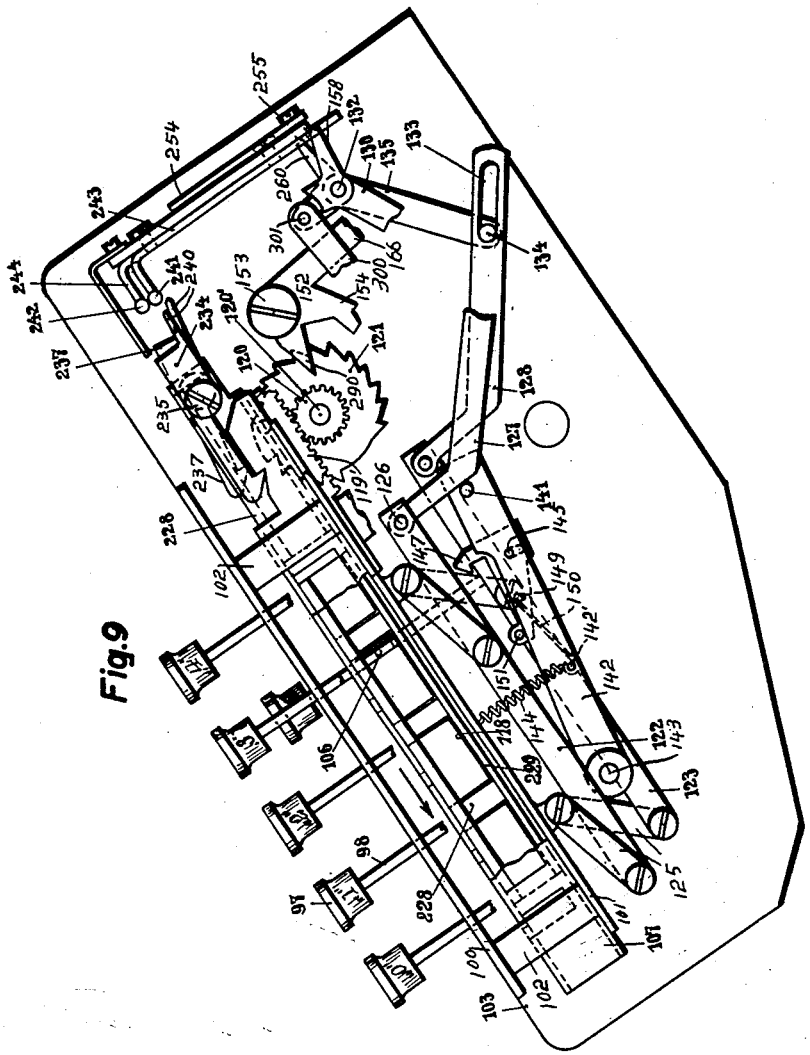

April 2, 1946.  K. B. W. KIEL  2,397,745
ADDING MACHINE
Original Filed Aug. 12, 1938   12 Sheets-Sheet 12

INVENTOR
K.B.W.KIEL
By John Ehink
ATTORNEY

Patented Apr. 2, 1946

2,397,745

UNITED STATES PATENT OFFICE 2,397,745

ADDING MACHINE

Karl Berthold Wilhelm Kiel, Glashutte, Germany; vested in the Alien Property Custodian Continuation of application Serial No. 224,630, August 12, 1938. This application March 17, 1941, Serial No. 383,890. In Germany August 14, 1937, D. R. G. M.

7 Claims. (Cl. 235—60)

This application is a continuation in part of my application Serial Number 224,630 filed August 12, 1938.

This invention relates to an adding machine with which is combined a multiplying arrangement capable of operating by shortened multiplication.

It is well known that multiplying can be done on adding machines by adding repeatedly the value set up, as by actuating the repeat key and pressing down the motor key repeatedly. This method of operating, however, requires keen attention on the part of the operator, and experience has demonstrated that it is not carried out without calculating errors. In order to overcome these difficulties a so-called multiplier setting mechanism has been provided on the adding machine and by means of this the "repeat" additions were carried out automatically by pressing a suitable key.

However, this did not provide means for utilizing the adding machine for large scale multiplication operations, because the adding machine, as a result of the oscillatory movements of its principal parts, was too slow in operation for the purpose intended.

It is an object of the present invention to adapt an adding machine notwithstanding its relatively slower operation for use as a multiplying machine. The multiplier setting mechanism according to the present invention is arranged so that the values above 4 are calculated by shortened multiplication.

A further object of the invention is to provide a particularly simple construction wherein a shifting member actuated by the multiplier setting mechanism acts on the stem of the motor key by means of an intermediate member such as a lever or the like.

A further object of the invention is to provide an arrangement wherein the switch means of the multiplier setting mechanism, which determines whether addition or subtraction is to be used, is connected with the state control means of the adding machine for reversing the calculating mechanism gears so as to set them for the desired addition or subtraction.

The accompanying drawings show one form of the invention. Referring to the drawings:

Figure 1 is a partial side view of the invention with the cover plate removed.

Figure 2 is a partial plan view with a portion of the cover plate removed.

Figure 2a is a continuation of the view in Figure 2 and to the right thereof.

Figure 4 is a cross sectional view taken on the section line IV—IV of Figures 2 and 2a looking in the direction of the arrows and with portions omitted for greater clarity.

Figure 5 is a horizontal cross sectional view taken on the section line V—V of Figure 3 with portions omitted for greater clarity.

Figure 8 is a cross sectional view similar to Figure 7 but with some of the parts omitted for greater clarity, illustrating the positions of the parts when the multiplier setting key "2" is depressed with a further showing in dot-dash lines showing the positions of some of the parts after the key "2" has been released and has moved upwardly to the position shown in Figure 8a.

Figure 8a is a view of a portion of Figure 8 showing the position of key "2" after being depressed and released so as to return part way to its original position.

Figure 9 is a view similar to Figure 7 with parts omitted for greater clarity, illustrating the positions assumed by certain elements when the multiplier setting key "6" is depressed.

Figure 14 is a cross sectional view taken on the section line XIV—XIV of Figure 7 looking in the direction of the arrows and illustrating the particular controls for the multiplier setting keys "0" and "9".

Figure 15 is a similar view to Figure 14 showing the parts in a different position.

Figure 16 is a cross sectional view taken on the section line XVI—XVI of Figure 7 and looking in the direction of the arrows, illustrating particularly the control means for the reversing of the calculating or totalizing gears and the control for the means governing the step by step movement of the ratchet shifting means.

Figure 7:
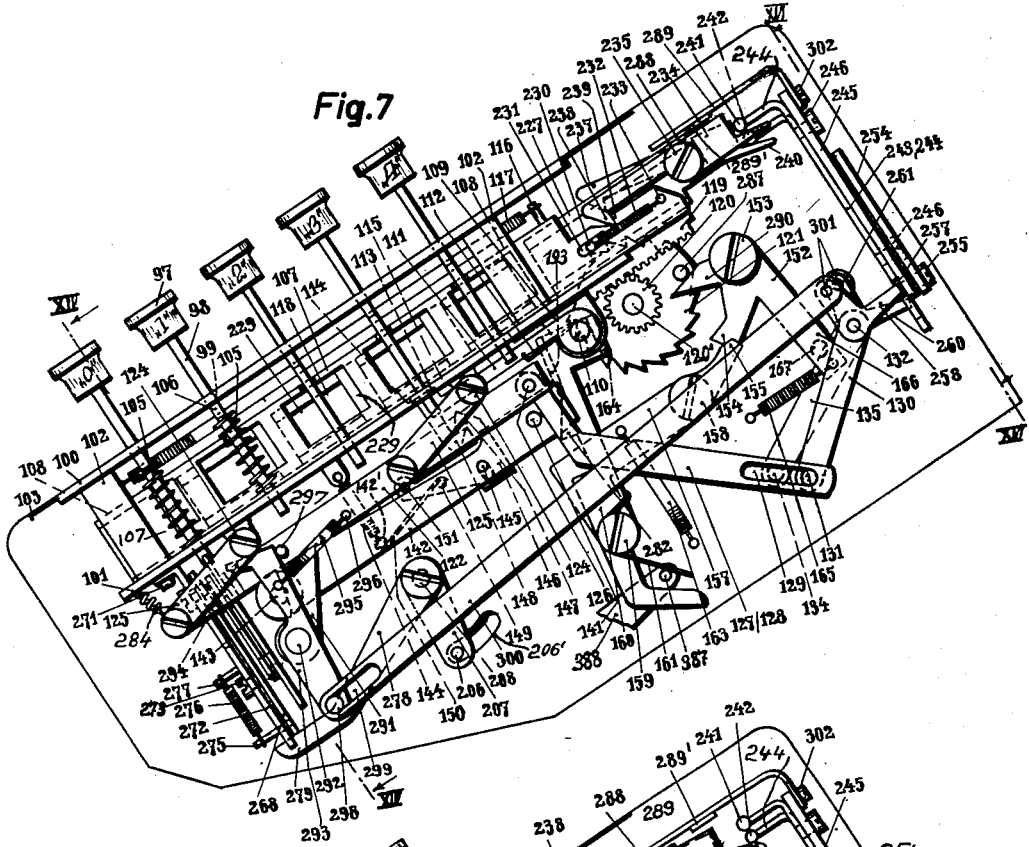
Figure 7 is a cross sectional view of the multiplier setting mechanism in initial position.

Figure 17 is a partial perspective view illustrating the construction of a tubular differential rack bar and cooperating U-shaped compensating bars determining the step-by-step movements to be given to the ratchet wheel in accordance with the particular multiplier setting key depressed, Figure 18 is a cross sectional view taken on section line XVIII—XVIII of Figure 15, and Figure 19 shows a portion of Figure 7 on an enlarged scale.

The invention is illustrated and described as based upon the well known "Astra" type of adding and subtracting machine, such as shown in Patent to Greve, No. 1,897,932 issued February 14, 1933.

*The adding and subtracting machine*

Arranged on the keyboard 301 of the adding machine in well known manner are the nine numeral keys 301', which are designated "1"-"9". The zero keys 302, 303 and 304 cooperate in well known manner with the traveling setting pin carriage 305. "R" designates the repeat key through the setting of which the well known clearing mechanism acting on the pin carriage is disconnected. 306 designates the clearing lever for the pin setting mechanism. The key 307 having the minus sign (—) sets the machine for subtraction, that is, by pressing such key, the means for reversing the calculating or totalizer gears is actuated to cause the calculating mechanism to operate subtractively. 308 designates the key by which the intermediate total is determined and 309 designates the total key. The operation controlled by keys 308 and 309 need not be described since it is full shown in U. S. Patents to J. E. W. Greve, Nos. 1,897,932 granted February 14, 1933, No. 1,953,557 granted April 3, 1934.

The setting piece carriage 305 is provided below and above with two rollers 420 supported by upper and lower guide rails 421 attached to the machine frame. The pin carriage is provided with a plurality, in the present example ten, vertical rows of setting pins 333, each row comprising nine pins, so that the pin carriage of the present exemplary embodiment carries ninety such pins. The setting pins are set by means of the keys 301' or 302, 303 and 304.

Zero key 302 is attached to a key lever 359 journaled on a shaft 360 attached to the machine frame. The lever 359 is provided with a downwardly extending arm 361 with which the forward end of a pin-setting rod 362 is engaged. The rear end of rod 362 is slidably guided longitudinally in a perpendicular bracket plate 422 attached to the machine frame. This end of rod 362 extends within range of the lowermost sliding setting pins 333, which correspond to the "0" value. The keys 303 and 304 act in a similar manner on similar rods. The operation of these keys is shown in Patent No. 1,707,303 granted to J. E. W. Greve, April 2, 1929.

The numeral keys 301' are attached to the suitably formed nine key levers 423, which are also journaled on the shaft 360. Each key lever 423, except that which carries the "9", has a downwardly extending arm 424, each connected with the forward end of its individual pin-setting rod 425. The rods 425 are held so as to be longitudinally slidable at their rear free ends in the guide plate bracket 422.

The rod 425 which is connected with the key 301' designated "1", acts on the second transverse row of sliding setting pins 333 which correspond to the value "1". The key 301' designated by "2" cooperates with the rod which is coordinated with the third transverse row (from the bottom) of sliding setting pins 333, and so on. Keys 302 and 301' also cooperate with an escapement mechanism for the lateral movement of the carriage 305, which comprises the following construction.

The lower edges of the key levers 423 and 359 which carry the corresponding keys 301' and 302 engage a cross bail 426, as shown in Fig. 5 are mounted in the arms 427 attached to the shaft 360, which is rotatably journaled in the machine frame. One arm 427 is connected by a pin 428 to one end of a link 429 which at the other end, is pivoted to a crank 430 attached to a shaft 431 rotatably journaled in a bearing 432 attached to the machine frame.

An escapement member 433 is also attached to shaft 431 and carries a holding tooth 433' normally out of engagement with a horizontal escapement rack 310 mounted on the pin carriage 305. (See Fig. 5.) A co-acting escapement member 434 is slidably mounted on the escapement member 433. For this purpose, the two attaching screws 435 engage the escapement member 433 through slots 436 of escapement member 434. The upper escapement member 434 is provided with a tooth 437 corresponding to the tooth 433' and normally engaging the escapement rack 310. A traction spring 439 attached at 440 to the escapement member 433, and at 438 to the escapement member 434, tends to shift the shiftable escapement member 434 in the direction of the arrow in Fig. 5, but is prevented from movement by the engagement of its tooth 437 with the rack 310 attached to the carriage.

Figure 3:
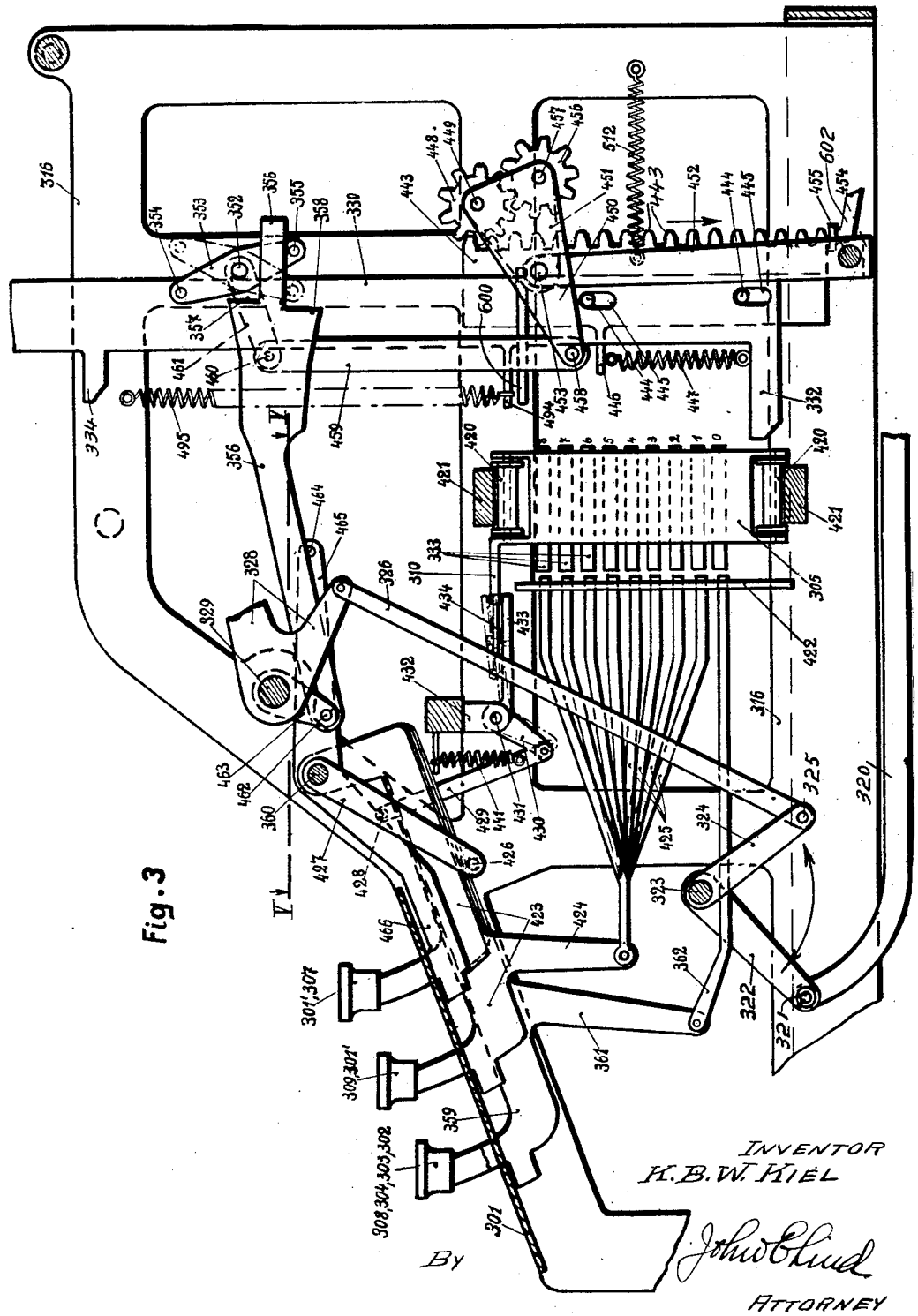
Figure 3 is a cross sectional view taken on the section line III—III of Figures 2 and 2a with parts broken away and omitted for greater clarity.

If one of the keys 301' or 302 is depressed not only is the corresponding setting pin 333 of the vertical pin row in front of the rods 425 moved to the right from the position shown in Fig. 3, but also, at the same time, by means of the elements 426 to 430, the escapement member 433 is swung, against the traction of a spring 441, into the dotted line position of Fig. 3 to engage its tooth 433' with rack 310, while tooth 437 of escapement member 434 is released therefrom and moves to the dotted line position of Fig. 5 through the traction of spring 439.

When the depressed key is released, then, the spring 441 rocks the escapement member 433 downwardly to disengage its tooth 433' from rack 310 and simultaneously engage the spring urged tooth 437 with the rack 310. Under the pull of the stronger traction spring 442 engaged with the pin carriage, the carriage is moved in the direction of the arrow in Fig. 5 for the distance of one rack tooth and the escapement member 434 again assumes the position shown in full lines in Fig. 5. The carriage has thereby been moved the distance between adjacent rows of pins 333.

Associated with pin carriage 305 are a number of type carrying bars 330, of which, as shown in Figs. 2a and 5, eleven are provided arranged in adjacent relationship. It is to be noted that ten of these bars carry the types "0"-"9", while the eleventh has mounted therein the types representing the symbols or signs. The individual types 331 are arranged slidably on the bars 330. Provided at the lower end of each type bar 330 is a projecting shoulder 332 which extends within range of the setting pins 333 slidably mounted in pin carriage 305.

The type bars 330 are also each provided with an arm 334 (Fig. 1) over which a common cross bar 335 engages. The bar 335 is carried by a slide 336 which is moved upwardly by a link 337 connected thereto and a control lever 338 connected to link 337, when the machine is operated. In this manner all the type bars 330 are released, so that they can pass upwardly under the pull of the traction springs 495 engaged with projections 494 thereon until the corresponding shoulders 332 contact the projected setting pins 333 of the pin row coordinated therewith.

A rack 443 associated with each type bar 330 is provided with two pins 444 engaging in slots 445 of the bars 330. Each rack is provided with an arm 446 to which a traction spring 447 is engaged. The other end of spring 447 is attached to the bar 330 with which the rack 443 is associated. The spring 447 tends to move the rack 443 relative to the bar 330 in the direction of the arrow in Fig. 3.

The control of the bars 330 and consequently the actuator racks 443 is described in the above mentioned Patent No. 1,707,303. This control acts on the bars 330 so as to retain in lowered position, those bars 330 into whose path no pin in the carriage 305 has entered.

*The calculating mechanism gears and reversing means therefor*

Coordinated with the racks is a calculating mechanism consisting of a suitable number of totalizing gear wheels 448. The gears 448 are journaled on a shaft 449, mounted in the two parallel end plates 450 and 451 which are pivoted intermediate their ends to the upper ends of levers 452 at 453, and the levers 452 are disposed at both sides of the set of the type carrying bars 330. The levers 452 are interconnected at the bottom by a crossbar 454 and are mounted oscillatably on a trunnion 455 attached to the machine frame.

Each gear 448 of the calculating mechanism is engaged with a reversing gear 456 individual thereto. The gears 456, which have the same number of teeth as the gears 448, are journaled on a shaft spindle 457 parallel with the shaft spindle 449 and likewise attached to the two frame plates 450 and 451. Engaged with forward end of the plate 450, at 458, is a link 459 connected by a pivot pin 460 to a lever arm 461 fixed to the shaft 352 journaled in the machine frame 316. A double crank 353, provided at both diametrically opposite ends with pins 354 and 355 is fixed to shaft 352. By rocking the double crank 353 into the dotted line position of Fig. 3, the rocking calculating wheel frame including the end plates 450 and 451 is swung about the pins 453 so that the calculating mechanism gears 448 unmesh from and the reversing gears 456 mesh with the differential racks 443. In this manner a certain predetermined movement of the racks in one direction with respect to the calculating mechanism gears 448 is reversed to the opposite direction and brings about the opposite method of calculation, that is, the value based on the magnitude of the rack movement is not added, but subtracted.

The tens transfer for the calculating mechanism 448, 456 is effected through the lever arm 602. The details of the tens transfer are described in Patent No. 1,897,932 granted to J. E. W. Greve, February 14, 1933.

The double crank 353 is set in one or the other terminal position by a pitman 356 provided with the two shoulders 357 and 358 and is journaled at one end at 462 on the end of arm 463 fast on a counter shaft 329 journaled in the machine frame 316. Also mounted on the countershaft 329 is a bellcrank lever 328 connected by a link 326 to an arm 324 attached to the main drive shaft 323. Through a means hereinafter described, the main shaft describes an oscillatory movement which is transmitted through the link 326 into a similar movement of the arm 463 connected to the countershaft 329.

A pin 464 attached to an arm 465, engages under the pitman 356. Arm 465 is an extension of the key lever 466, which is journaled on the fulcrum 360 and which carries the subtraction key 307 bearing the minus (—) sign. It is apparent that by pressing on the key 307, the pitman 356 is swung upwardly so that the shoulder 357 comes in front of the pin 354.

If the double crank 353 was previously in the position shown by the full lines in Fig. 3, then, in the rearward travel of the arm 463, the double crank 353 will be swung by the pitman 356 into the dotted line position in Fig. 3 and the calculating mechanism gears 448 and 456 thus moved to the subtracting position.

*The motor drive and coupling means*

The keyboard 301 is also provided with the motor key 311 (Fig. 1) carried by the stem 312. The lower end of stem 312 is pivoted at 313 to an arm 314 fixed to shaft 315 journaled in the machine frame 316. Connected to shaft 315 is another arm 317 to which a connecting rod 318 is connected. The arm 317 is under the action of a spring 317' to return the motor key 311 after such key has been released. Rod 318 (Figs. 2 and 2a) is connected by a pivot pin 467 to the lever 468 which actuates the clutch and contact devices and which is journaled at 469 in the housing 319.

Attached to one end of the lever 468, with an interposed insulating member 470, is an electrical switch member 471 which cooperates with the two spring pressed contacts 472. The springs of the contacts are in the circuit of an electric motor 473, on the shaft 474 of which is attached a worm gear 475 which meshes with a worm gear 476 attached to a vertical shaft 479 journaled in bearings 477 and 478 (Fig. 1a) in the housing 319.

Attached to the shaft 479 is a ratchet tooth 480 with which the nose 482 of a pawl 481 cooperates. Pawl 481 (Fig. 1a) is pivoted at 483 on a cam disc 484 freely rotatable on the vertical shaft 479. A pressure spring 485, supported on a projection 486 on the cam disc 484 acts on the pawl 481. Cooperating with the free end of the pawl 481 is the hook end 487 of the lever 468, so that when the lever 468 assumes the position of Fig. 2a the hook end 487 holds the nose 482 of the pawl 481 out of engagement with the ratchet tooth 480.

Cooperating with the cam disc 484 is a cam roller 488 mounted on one arm of a forked lever 489 pivoted on pin 490 provided in the housing 319. The other arm of lever 489 is pivotally connected by pin 491 to a link 492 which, in turn, is pivotally connected to the rear end of a transmission rod 320. The other end of rod 320 is pivotally connected by pin 321 to lever arm 322 fixed to main shaft 323.

Thus, if the motor key 311 is depressed, then, by means of the arms 314 and 317, the connecting rod 318 is moved to the left as shown in Figs. 1, 1a, 2 and 2a and the lever 468 is swung in the direction of the arrow in Fig. 2a whereby, through the switch member 471, the circuit for the electric motor 473 is closed and at the same time the hooked end 487 of the lever 468 releases the pawl 481, so that its nose 482 may be engaged by the ratchet tooth 480.

In the ensuing rotation of the vertical shaft 479 by motor 473, the cam disc 484 is carried along and rocks the lever 489 to first draw, the transmission rod 320 to the right from the position shown in Figs. 1, 1a, 2 and 2a thereby rotating the main shaft 323 counter-clockwise. The spring 493 connected at one end to the frame and at the other end to rod 320 maintains roller 488 in contact with cam disc 484 and returns the transmission rod 320 to its initial position, thereby rotating shaft 323 clockwise and returning the members connected therewith to normal.

Figure 1A:
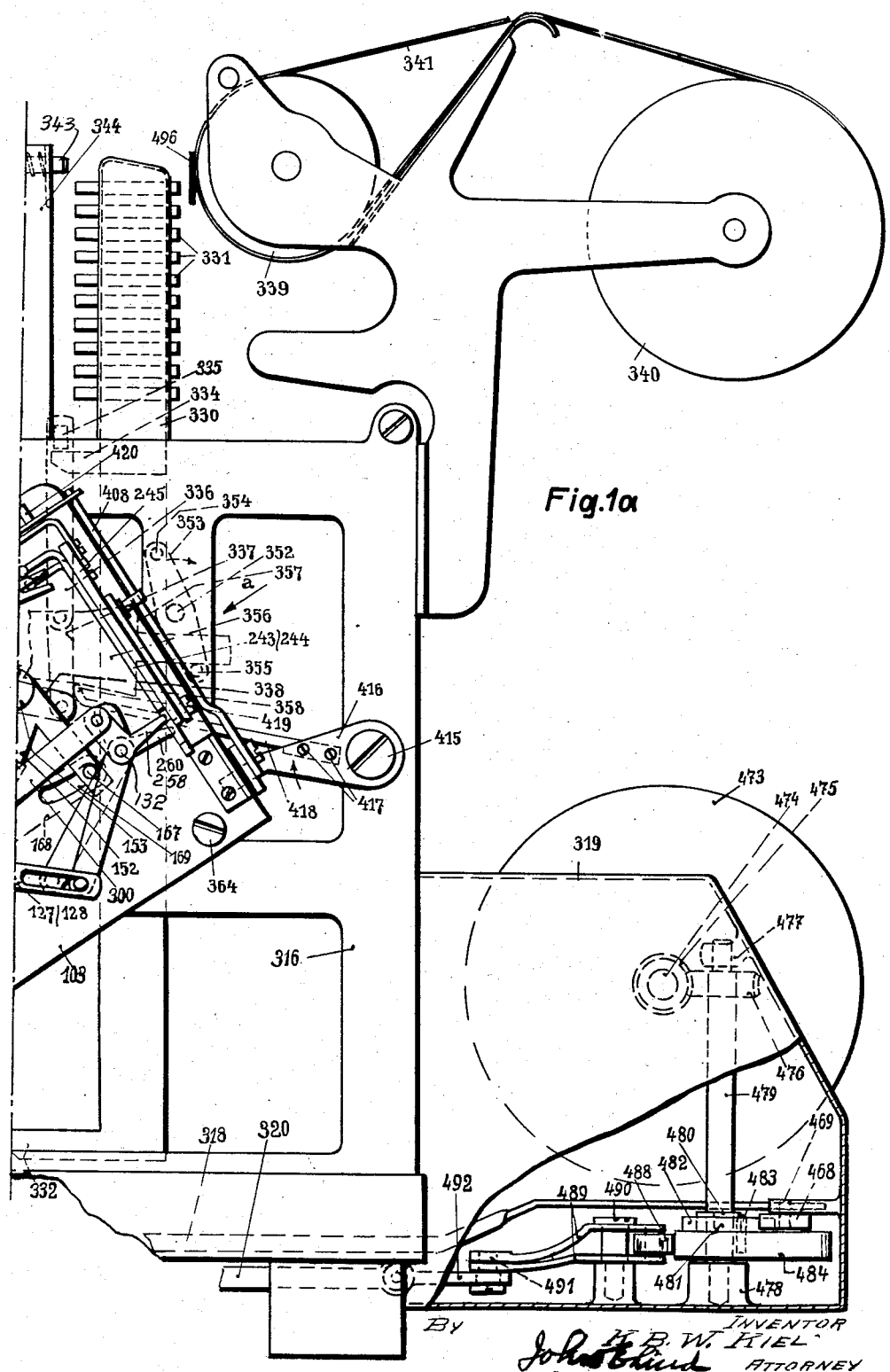
Figure 1a is a continuation of the view shown in Figure 1 and to the right thereof.

It is to be noted that during the swinging movement of the arm 322 in the direction of the arrow in Fig. 1, the type carrier and rack restraining and restoring bail 335, 336 is moved upwardly, so that the type carrier and rack bars 330 are released and can pass upwardly due to the traction of the springs 495 engaging projections 494 on the type carriers, until the projecting feet 332 strike against their corresponding extended sliding pins 333. The stop for the key 301', designated "9", is the abutment plate 600 (Fig. 3). If such key is depressed the pin carriage 305 makes an advance without one of the pins 333 being moved out. The corresponding typecarrying bar 330 can then ascend until its foot 332 strikes against abutment plate 600. This operation is also described in Patent No. 1,707,303 above mentioned. In this upward movement of type carrier and rack bars 330 the types 331 are carried into the range of the printing device, which consists substantially of the platen 339 (Figs. 1a and 2a) over which the paper strip 341 coming from the roll 340 runs. The ribbon 496 is disposed in front of the platen 339.

*Engaging and disengaging the calculating gears and their racks*

It is to be noted primarily that during the upward movement of the type carriers and rack bars 330 the calculating mechanism gears 448 and 456 must not operate. On the other hand, the calculating gears are to be swung into operative position, that is, into engagement with their racks 443 prior to the return of the type carrier and rack bars 330 to the initial position. For this purpose the control means shown particularly in Fig. 4 are provided.

Fixed on one of the arms 452 of a U-shaped bail member 452, 454 journaled on a cross-rod 455 near the base of the machine, is a pin 497 which cooperates with a latch 498. The latch is journaled at 499 to a frame extension arm 500 and is subjected to the action of a traction spring 501 which always tends to hold latch 498 engaged with the pin 497. The free end of latch 498 is provided with a pin 502, with which a toggle pawl 503 cooperates. The toggle pawl is pivoted at 504 to the free end of swinging arm 505 attached to counter-shaft 329. In the initial position of the machine, the arm 505 assumes the position indicated in Fig. 4 by the full lines, and the finger-like extension 506 of the toggle pawl 503 is applied, through the pull of the engaging traction spring 507, against the pin 502. However the spring 507 is so weak that it can not overcome the action of spring 501.

Mounted on a prolongation of the bail arm 452, on which pin 497 is provided, is another pin 508 over which the forked end provided on one arm of a lever 509 engages. The lever 509 is journaled at 510 on the machine frame 316. The free end of lever 509 is provided with a stud 511 engageable by the toggle pawl 503 carried by the arm 505.

The motor key 311 (Figs. 1, 1a, 2 and 2a) upon depression, starts the motor 473 which rotates the main drive shaft 323 counter-clockwise which through the link 326, rocks the counter-shaft 329 and its arm 506 counter-clockwise in the direction of the arrow in Fig. 4. In this swinging movement, the lower shoulder of the toggle pawl 503 strikes against the pin 502 to disengage the latch 498 from the pin 497 so that the bail arms 452 together with the calculating mechanism gears 448 and 456 can swing through the traction of spring 512 to the right, as shown in Fig. 4, to disconnect the gears of the calculating mechanism from the racks 443. After the pawl 503 has escaped past the pin 502, the latch 498 is again drawn into its operative position, wherein the prolonged end of latch 498 rests on the pin 497. Thus, immediately after the beginning of the upward movement of the type carrier bars 330, the calculating mechanism gears are rocked to their inoperative position.

When the main drive shaft 323 reaches its extreme clockwise limit of travel, the arm 505 assumes the dotted line position of Fig. 4, in which position the finger-like extension 506 of the toggle pawl 503 is applied against the stud 511 of the lever 509 which, because of the rocking of the totalizer supporting bail arms 452 when disconnecting the calculating gears 448, 456 from their type carrier and rack bars 330, is in the dotted line position of Fig. 4 corresponding to the position of the bail arms 452. At the beginning of the reverse or return rotation of the counter-shaft 329, and therefore, before the downward movement of the type carrier and rack bars 330, the upper shoulder of the toggle pawl 503 strikes against the stud 511 and the lever 509 is swung back into the position shown in full lines in Fig. 4.

In this swinging movement of the lever 509, pin 508 moves the bail arms 452 and the calculator gears 448, 456 back to the initial position shown in full lines in Fig. 4. As soon as this initial position is reached, the latch 498, due to the action of spring 501, grips the pin 497 to retain the calculator gears 448, 456 connected with their racks 443.

The state control pitman 356 (Fig. 3) is timed to operate during the initial half of the rocking stroke imparted to the main drive shaft 323, to adjust the calculator gear frame 450 to determine whether the positive gears 448 or the negative gears 456 shall be engaged with the racks 443 of the type carrying bars 330 on the return of the gears to engagement with said racks.

After such re-engagement of the selected set of calculator gears with their racks, the restraining and restoring bar 335 (Fig. 1a) is lowered to return the actuated type bars 330 to their normal home positions, during which return, the calculating gears are differentially rotated in a positive or negative direction, depending upon which set of gears 448 or 456 is engaged with the racks 443.

*The printing mechanism*

The printing mechanism which enters into operation when arm 505 assumes the dotted line position of Fig. 4 operates in the following manner.

It is first to be noted that the plungers 343, shown in Fig. 1, are opposite the ribbon 496. The hammer levers 345, mounted oscillatably on the common shaft 346, cooperate with the plungers, which are guided axially by, and are slidable in the support 344 being held by the springs 343' in the position shown in Fig. 1. The hammer levers 345 are subjected to the action of springs (not shown) which tend to swing them in the direction of the arrow shown in Fig. 1. The tensioning of the hammer levers 345 is effected by the crossbar 347 forming part of the rocking hammer releasing and restoring bail 347, 348 connected with a lever arm 349 in the slotted end 350 of which a pin 351 on one arm of the bell crank lever 328 engages. The hammer levers 345 are provided with the well known checks, stops or the like which, when the machine is actuated, and assuming that it is set for printing, are released, so that, under the pull of the springs engaged therewith the hammer levers contact the reinforced ends of the plungers 343 and move these so that they strike the type in front of them against the paper 341 with the ribbon 496 interposed.

The above well known arrangements, which serve for addition and subtraction, are coordinated with a multiplier setting mechanism, described hereinafter and by means of which shortened multiplication is possible.

The multiplier setting mechanism

The parts belonging directly to the multiplier setting mechanism are mounted on the base plate 103, attached by screws 363 and 364 to the machine frame 316 of the adding machine. The multiplier setting mechanism has ten multiplier setting keys 97 bearing the indicia "0"–"9" which are disposed at the right of the keyboard 301 of the adding machine.

Figure 11:
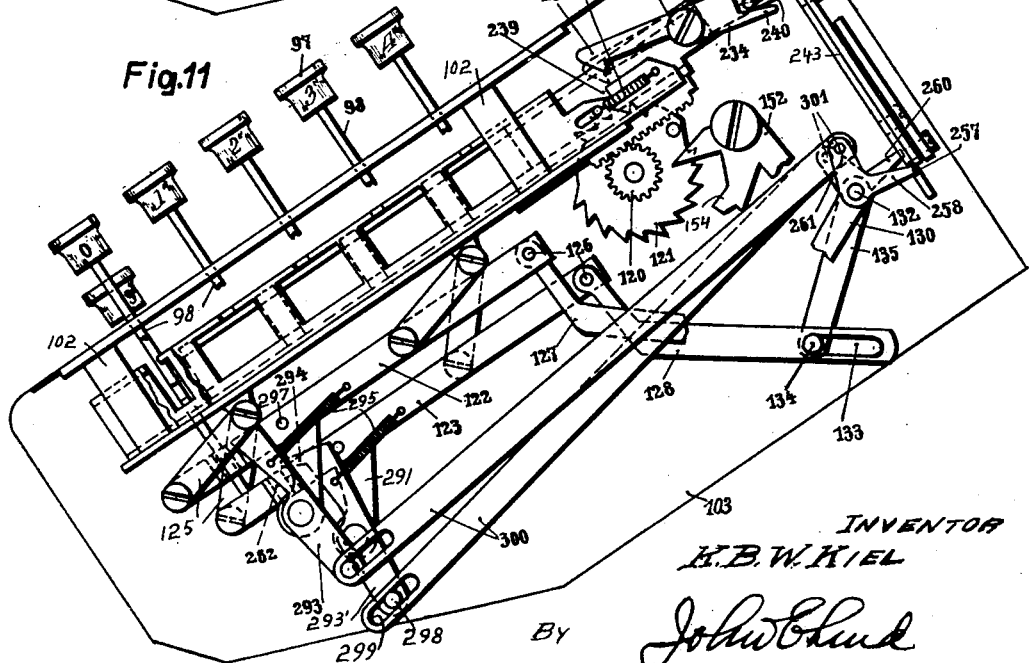
Figure 11 is a view similar to Figure 7 with some of the parts omitted for greater clarity, illustrating the positions assumed by various elements when the multiplier setting key "9" is depressed.

Each of the keys 97 is mounted on a stem 98 (Figs. 7 and 11). The upper ends of the stems 98 are guided in slots 99 provided in an upper keyboard plate 100, while the lower ends are guided in corresponding slots of a lower keyboard plate 101 attached by cross members 102 to the upper key board plate 100.

The cross members 102 are fixed to the frame wall 103 by the screws 104. Encircling the lower end of the key-stems 98 are the springs 105 which urge the cross extensions 106 on the key-stems against the lower face of the upper key board plate 100 and thus tend to hold the key-stems in the initial position.

The main shaft oscillation control

Longitudinally slidable between the two rows of key-stems 98 is a rectangular tube 107 constituting a differential bar which is guided in suitable apertures 108 provided in the cross members 102. Attached to the lower face of the tubular differential bar 107 is a bearing eye 109 which extends downwardly through a longitudinal slot provided in the lower key board plate 101. Journaled in the eye 109 by the pivot pin 110 is a latch 111 with which a spring 112 engages and which tends to force the latch upwardly. In the initial position shown in Fig. 7 the nose 113 of the latch 111 is applied against the end 114 of the longitudinally extending slot 115 provided in the lower key board plate 101. A traction spring 117 engages at one end the pin 116 provided on the differential bar 107 and at the other end is attached to the front cross member 102. This spring urges the differential bar 107 to the left, as shown in Fig. 7. In the normal position shown in Fig. 7 the differential bar is locked by the latch nose 113.

The hollow differential bar 107 is provided on both sides with window-like openings 118 (see Fig. 17) which connect with recesses 119 provided on the upper side of the differential bar. When the differential bar 107 is in the normal position, these recesses 119 are positioned exactly under the cross extensions 106 of the multiplier key-stems 98. It is to be noted that the recesses 119 are substantially only as wide as the thickness of the multiplier key-stems 98. Also, the window-like openings 118 are so arranged with relation to the recesses 119 that, when the cross extensions 106 of the multiplier key-stems have entered the recesses 118 due to pressure on the keys, and the latch 111 is released, the differential bar 107 may advance various extents of travel under control of the particular multiplier key depressed, and according to a system of shortened multiplication. Thus, with respect to the row of multiplier keys of the lower digit values "0" to "4" inclusive, the opening 118 coordinated with the "0" key permits movement of the differential bar for the distance $x$, the opening coordinated with the "1" key for the distance $2x$, and the opening coordinated with the "4" key permits a movement of the distance $5x$, etc. It is the same with the multiplier keys "5"–"9" of higher digit value, which permit the differential bar to advance graduated extents corresponding to the complementary values of the multiplier keys. The opening 118 coordinated with the "5" key thus permits a movement of the distance $5x$ and the opening 118 coordinated with the "9" key permits a movement of the distance $x$.

A rack 119' is attached to the rear end of the square tubular differential bar 107 and engages gear 120 journaled at 120' on the base plate 103 and connected to a ratchet wheel 121. A one tooth shift or rotation of the wheel 121 will cause a movement of the rack 119' and consequently of the differential bar 107 for a distance $x$.

Associated with the lower ends of the two rows of multiplier key-stems 98 are the two parallel motion bars 122 and 123 which are supported near their opposite ends by the respective pairs of parallel links 125 pivoted at 124 to the bottom of the lower keyboard plate 101. Angular links 127 and 128 (see Figs. 7 and 9) are pivoted at 126 to the respective rear ends of the parallel motion bars 122 and 123. The link 127 is provided at its lower end with a slot 129 in which a pin 131 provided on an operating arm 130 engages. The operating arm 130 is oscillatably journaled on a pin 132 attached to the frame wall 103. The lower end of the companion link 128 (see Fig. 11) is provided with a slot 133 into which extends a pin 134 attached to an operating arm 135 which is likewise journaled on pin 132.

Extending into the path of movement of the parallel motion bars 122 and 123 (see Fig. 9) is a pin 141 which is attached to a latch-disengaging lever 142 pivoted at its front end to the frame 103 at 143. A traction spring 144 (see Figs. 7 and 8) is engaged at 142' with the latch-disengaging lever 142, and the spring 144 tends to hold the lever 142 in the position shown in Fig. 7. Journaled on the latch-disengaging lever 142, at 145, is a pawl 146 having a projecting shoulder 147 which engages a shoulder 148 provided on the locking latch 111 for the differential bar 107. A spring 150 engages the pin 149 on the pawl 146 to hold the pawl in its effective position as determined by contact of the pin 151 on the pawl 146 against the upper edge of the latch-disabling lever 142.

Cooperating with the ratchet wheel 121 is a motor tripping member 152 journaled oscillatably at 153 on the base plate 103.

The motor tripping member 152 has an arm 154 which in one position of the member, serves as a locking dog for the ratchet wheel 121. The motor tripping member is retained in the position shown in Figs. 1 and 7 by the locking tooth 155 formed on the rear end of a locking lever 157 pivoted at 158 on the frame wall 103. The locking tooth seats in a recess provided in the locking dog 154 of the motor tripping member 152.

Journaled on the free depending end of the forward arm of the locking lever 157 at 159, is a detent 160 with which is engaged one end of a torsion spring 161, the opposite end of the spring being supported by a pin 387 projecting from one arm of a restoring bell crank 388 (Figs. 1 and 13) pivoted at 389 to the side wall 103, and hereinafter more fully explained. For the present, the restoring bell crank normally lies at its counter-clockwise limit of travel shown in Fig. 13. Engaged with the locking lever 157, as shown, is the traction spring 163, which tends to hold the locking tooth 155 in engagement with the recessed dog 154. By means of the torsion spring 161, the detent 160 is given a tendency to swing counter-clockwise about pivot 159 to press a lateral projection on the upper end of the detent, against the projecting end of the pivot pin 110 for the differential bar latch 111.

The motor tripping member 152 is subjected to the action of a traction spring 165 which tends to turn the tripping member clockwise. The spring 165 is connected to an arm 166 of the tripping member 152, said arm 166 having a pin 167 connected to a thrust bar 168 (Figs. 1 and 8) mounted on the inner face of the frame wall 103, the pin 167 passing through a slot 169 of the side wall 103. The thrust bar 168 is provided with a longitudinal slot 170 (Fig. 8) into which extends a pin 171 projecting from the inner face of the wall 103 (Fig. 8). The left end 370 of the bar 168 extends to a point adjacent to a pin 371 (Fig. 1) on a rocker 372 pivoted at 373 to the frame of the adding machine and provided with an extended finger 374 which engages over a pin 375 provided on the stem 312 of the motor key 311.

The pin 387 on the rear arm of the restoring bell crank 388, serving as a support for the spring 161, extends into the plane of movement of the angularly bent end of the detent 160. The forward arm of the restoring bell crank 388 has a cam-like end 390 extending into the range of movement of an actuating arm 207 journaled at 208 (Fig. 13) on the outer face of the supporting side wall 103, and operable from the main drive shaft 323 or by the "0" and "9" multiplier keys, as will be explained in their proper order.

The step by step return of ratchet wheel

Figures 6, 13:
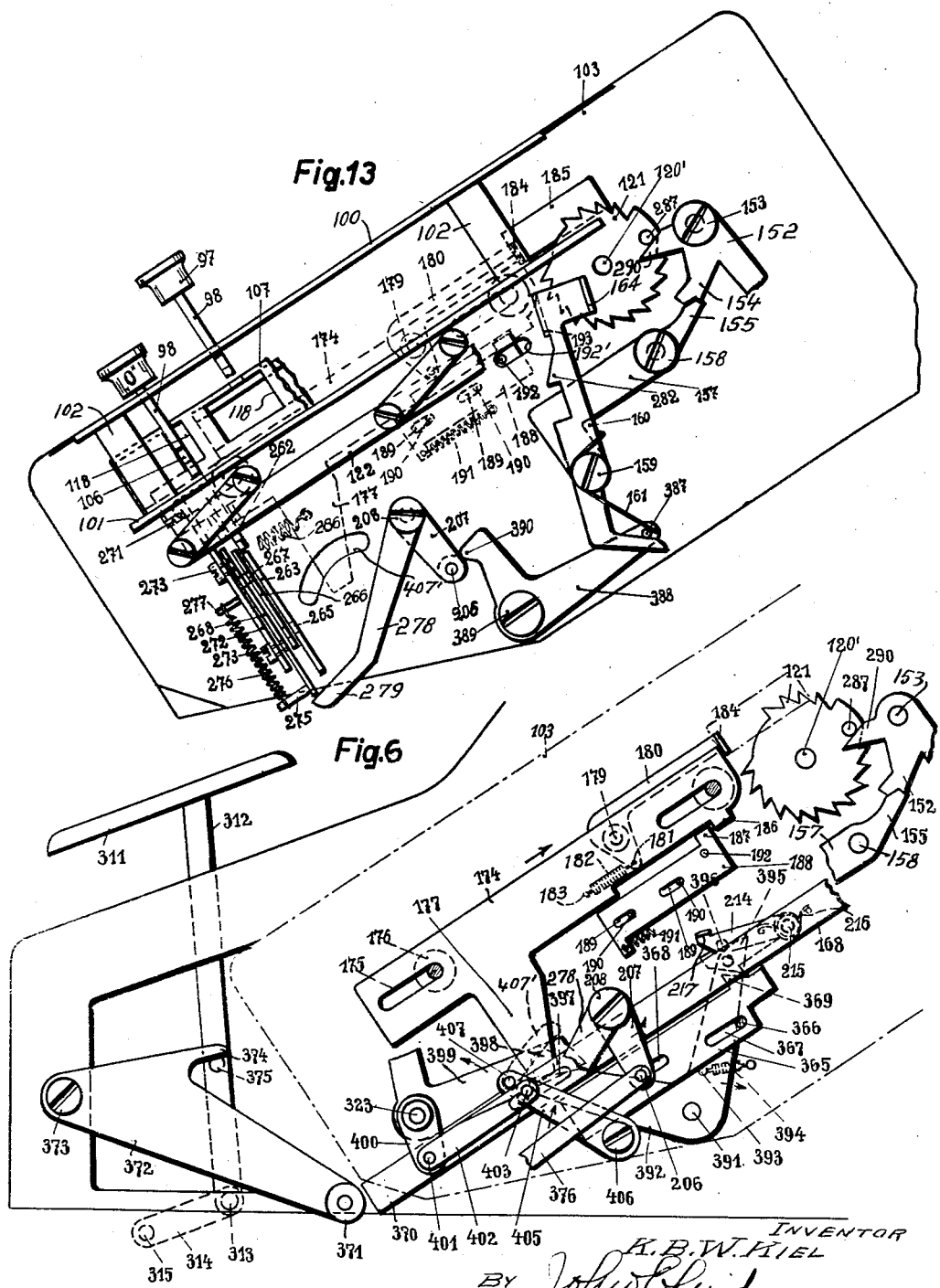
Figure 6 is a cross sectional view illustrating particularly the connections with the motor key and the means for securing the step-by-step return motion of the ratchet wheel.
Figure 13 is a partial cross sectional view similar to that shown in Figure 10 with parts omitted for greater clarity and other cooperating parts inserted in order to more clearly show the operation between such cooperating parts.

Attached to the main drive shaft 323 is a crank 400 (Figs. 1 and 6) to the free end of which, at 401, there is secured a connecting rod 402 pivoted at the other end on the pin 403 projecting from a point near the free end of a driving lever 405 oscillatably journaled at 406 on the outer face of the side wall 103. Provided at the end of driving lever 405 is a pin 407 which extends through a corresponding slot 407' in the supporting plate to a point adjacent the depending arm 177 provided on a ratchet restoring slide 174 arranged parallel with the inner face of the frame wall 103 so that said depending arm normally extends transversely of the slot 407' (Fig. 13). The slide 174 is longitudinally slidable on frame wall 103 and for this purpose is provided with longitudinal slots 175 through which the screws 176 attached to the wall 103 project. Journaled on the restoring slide 174 by pin 179 is a pawl 180, to the tail of which, at 181, there is attached a traction spring 182 and the other end of the spring is attached, at 183, to the restoring slide 174. The lever-like plate 180 is provided with a rectangular bent extension 184 which extends through a guide aperture 185 provided in the frame wall 103 within range of the ratchet wheel 121 (see Figs. 6 and 13).

Near its rear end, the ratchet-restoring slide 174 is provided with a downwardly extending projection 186 (see Figs. 6 and 13) cooperating with the projection 187 of a sliding plate 188 longitudinally guided by slots 189 provided therein through which extend pins 190 attached to the frame wall 103. The traction spring 191 engaged with the sliding plate 188 tends to move the plate to the right as shown in Fig. 6. Provided on the sliding plate 188 is a pin 192 which extends into the plane of an abutting surface 193 provided on detent 160.

Pivoted to thrust bar 168 at 215 is the dog 214, with which the torsion spring 216 engages to rock the dog counter-clockwise (Fig. 6) until arrested by contact of the angular projection 217 of the dog 214 against the upper edge of the bar 168. (Figs. 6 and 8.)

The carriage shift control

Coordinated with thrust bar 168 on the inner face of the frame wall 103, is an operating slide 365 provided with longitudinal slots 367 and 368. Engaging through the slot 367 is the guide pin 366 attached to the frame wall 103. A stud 206 mounted in the free end of the operating arm 207 which, it will be recalled, is pivoted to the outer face of the frame wall 103, extends through a slot 206' (Fig. 8) in said wall and through the slot 368 in the operating slide 365 on the inner face of the frame wall, the slots 206' and 368 being normally in substantial register. The operating slide is provided with a shoulder-like projection 369 which cooperates with the correspondingly formed projection 395 of the dog 214.

A release bell crank lever 392 (Fig. 6) is pivoted at its angle at 391 to the inner face of the frame wall 103, the rear arm of the bell crank extending upwardly to a point adjacent a pin 396 projecting from the dog 214 on the thrust bar 168. The forward arm of the release bell crank 392 extends into the return path of a stud 398 projecting from an arm 399 (see also Fig. 2) fast on the main drive shaft 323.

When the main drive shaft is at rest, the stud 398 of arm 399 contacts the forward arm of the bell crank 392 to rock it to, and retain it at, its counter-clockwise limit of travel.

Upon a cycling of the machine, the main drive shaft 323 will first rock counterclockwise with its crank 400 to remove the stud 398 from the end of the forward arm of the release bell crank 392, which frees the bell crank for clockwise movement under the action of a spring 394 connected at 393 to the rear arm of the bell crank.

This release bell crank 392 operates to disengage the dog 214 from the shoulder 369 of the operating slide 365 at the completion of each digit multiplying operation, in a manner hereinafter explained.

*Means for aligning and disaligning the corresponding openings in the differential bar and the compensating bars.*

Considering the case in which, through shortened multiplication in the immediately preceding decimal position, the next decimal position is greater by the value "1" than the value of the number, two U-shaped channel bars 227 and 228 are longitudinally slidably positioned (see Fig. 17) in the hollow, tubular differential bar 107. The channel bars or compensating bars 227, 228 lie parallel within the differential bar, with their open faces apposed, and their webs facing outwardly adjacent the opposed series of openings 118 in the side walls of the differential bar. The webs of the respective compensating bars 227, 228 each have a series of graduated openings 229 formed therein corresponding with, and under certain conditions, adapted to register with the respective series of graduated openings 118 of the differential bar. Attached to each compensating bar is a pin 230 (Fig. 7) which extends through a slot 231 provided in each side wall of the differential bar 107. Engaged with each pin is a traction spring 232, fastened at the other end, at 233, to the differential bar 107. The springs 232 thus tend to move the U-shaped compensating bars 227 and 228 relative to the differential bar 107, in such direction that the pins 230 are applied against the right or rear ends of the slots 231. In this position of the compensating bars 227 and 228 relative to the differential bar 107, the operative rear edges of the openings 118 are in operative relation to the rear edges of the openings 229 of the compensating bars 227 and 228. These compensating bars, however, as explained hereinafter, can, also, alternatively assume another position in which the corresponding rear edges of the window-like openings 229 project forwardly of the rear edges of the window-like openings 118, for a certain distance. This distance corresponds to the afore-mentioned distance x, which at the same time represents a one step movement of the ratchet wheel 121.

This alternative position of the compensating bar 227 or 228 relatively to the differential bar 107 is maintained during cycling of the machine by the catches 234, 237, one for each of the compensating bars, which catches are pivotally mounted at 235 to their respective compensating bars to travel therewith. The teeth 238 of the respective catches 234, 237 enter notches 239 formed on the upper edges of the reduced side walls of the differential bar 107 at its rear end.

In the normal positions of the parts with the machine at rest and set for additive or positive multiplication, as shown in Fig. 7, the tooth 238 of the catch 234 is seated in its notch 239 of the differential bar to cause the differential bar, when advanced by its superior spring 117, to draw with it the compensating bar 227.

The catch 237 of the compensating bar 228, under the above conditions is normally disengaged from its notch 239 in the differential bar, so that the differential bar will have a one step advance or lead before the rear end of the slot 231 in the differential bar picks up the pin 230 of the left hand compensating bar 228 associated with the row of multiplier keys of higher value.

Upon the return of the differential bar 107 to its normal home position, and as it starts on its last step of return travel, the rear end of that compensating bar which is not connected with the differential bar, contacts and is arrested by an abutment 289' (Figs. 12 and 19) carried by an overhanging bracket 289 fastened at 302 to the rear frame plate, and as the differential bar reaches its home position, the rear end of that compensating bar which is connected with the differential bar contacts the abutment and is slightly displaced sufficiently to relieve the frictional engagement of the catch with its notch 239.

After the return of the differential bar is complete, either catch 234, 237 may be selected for operation depending upon the value of the multiplier digit key to be set.

Torsion springs 235' (see Fig. 19) urge the projections 238 of the catches 234 and 237 into the corresponding notches 239 of the differential bar 107 provided their own weight is not sufficient to do so.

*Setting control*

The rear ends of the catches 234 and 237 are reduced to form tails extensions 240 which extend obliquely rearwardly into the range of the laterally projecting abutment fingers 241 and 242. The finger 241 is attached to the angular extension of a catch-controlling bar 243, while the finger 242 is attached to the angular extension of a catch-controlling bar 244 (see Fig. 9) arranged in parallel spaced relation with its companion catch-controlling bar 243.

The catch-controlling bars 243 and 244 are vertically slidable on the inner face of the rear frame plate 245 attached at right angles to the plate 103. Headed fastenings 246 attached to catch-controlling bars 243 and 244 (Fig. 16) pass through slots 247 provided in the rear frame plate 245. Journaled between the two catch-controlling bars 243 and 244, on the outer face of the rear frame plate at 249, is a rocking cross beam 248 carrying at its opposite ends the pins 250 which engage the catch-controlling bars 243 and 244. The pins 250 project through the elongated slots 251 provided in the rear frame plate 245. By means of this rocking cross beam 248 the two catch-controlling bars 243 and 244 are positively interconnected so that when the one is moved downwardly the other is moved upwardly correspondingly. The rocking cross beam 248 is held at both end positions. For this purpose, the pointed end 252 of the rocking cross beam 248 cooperates with the gable-shaped extension 253 provided on a keeper 254 pivoted at 255 to the rear frame plate 245, and acted upon by a spring 256.

Each catch-controlling bar 243 and 244 is provided with a recess 257. Extending into the recess 257 of the catch-controlling bar 243 is one arm 258 of a bellcrank lever having another arm 259. The bellcrank lever 258, 259 is mounted to rock on a cross rod 132, and is connected with the lever arm 130 (Fig. 11). Engaging in the recess 257 of the catch-controlling bar 244 is an arm 260 of a similarly supported bellcrank lever having another arm 261 and the bellcrank lever is connected to the lever 135.

Figure 10:
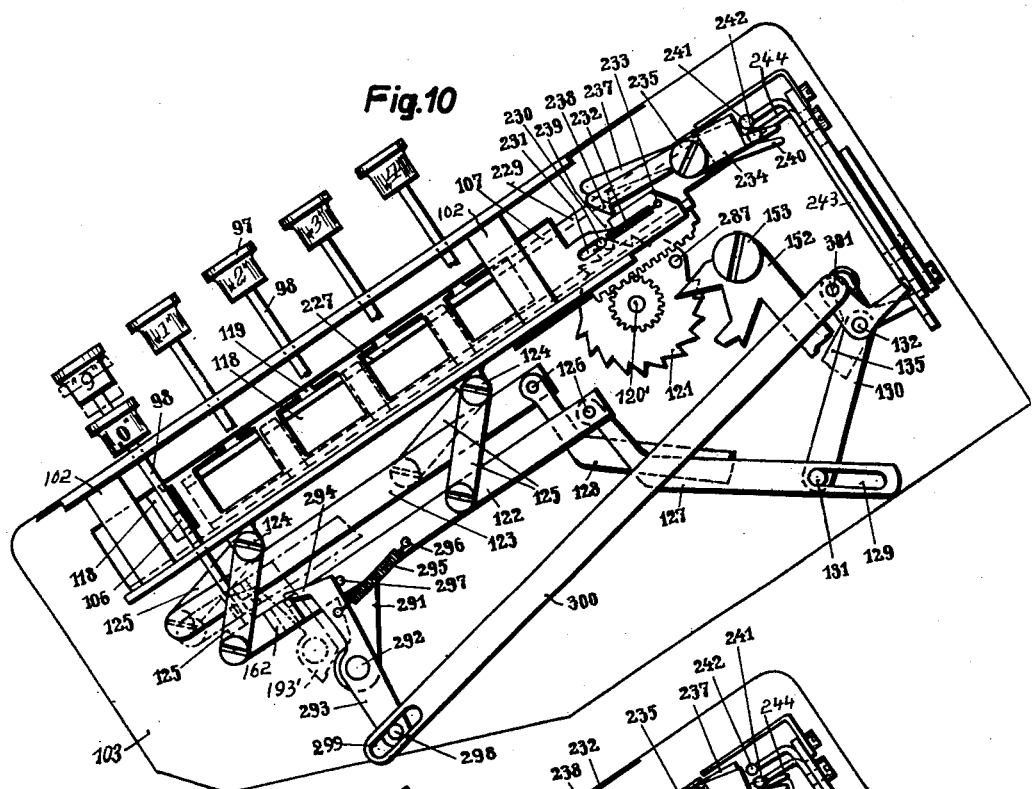
Figure 10 is also a view similar to Figure 7 with parts omitted for greater clarity, illustrating the positions taken by some of the parts when the multiplier key "0" is depressed.

As the lower ends of the key stems 98 extend into the range of the respective parallel motion bars 122 and 123, on pressing a key 97 the lower end of the corresponding key stem contacts with the parallel motion bar 122 or 123 and carries it into the position shown in Fig. 10 or Fig. 11. This causes the latch-releasing lever 142 and its coupling hook 146 to be swung downwardly to release the latch 111 restraining the differential bar 107 whereupon the spring 117 advances the differential bar into a position determined by the particular cross extension 106 on the depressed key stem.

*Means to automatically shift the multiplicand denominationally relatively to the multiplier*

Since, in certain cases, on pressing the multiplier keys "0" or "9" (such as on pressing the "0" key, when shortened multiplication was not used in computing the preceding denominational position, and on pressing the "9" key when shortened multiplication was used relative to the preceding denominational position) an advance is to be made of one denominational position, the following arrangement is provided.

The parallel motion bars 122 and 123 (see also Figs. 15 and 18) are provided, in the range of the key stems carrying the "0" and "9" keys, with offset portions 262, so that the key stems can pass by the parallel motion bars 122 and 123 freely. Disposed in the range of these two key stems for the keys "0" and "9" are the companion tongues 263 and 264 (see also Fig. 14).

These two tongues are respectively pivoted at 265 in spaced relation on a rocking plate 266 which is, in turn, pivoted at 267 on a vertically sliding plate 268. The two lateral extreme positions of the rocking plate 266 are determined by a pin 269 mounted on the vertically sliding plate 268 and this pin 269 extends into a rectangular recess 270 of the rocking plate 266.

The sliding plate 268 is vertically slidable on a base plate 272 attached by screws 271 to the lower key board plate 101 (see also Figs. 7, 13). For this purpose, the screws 273, which are attached to the vertically sliding plate 268 extend through corresponding slots 274 provided in stationary, depending base plate 272. Extending also also through the lower guide slot 274 is the pin 275 attached to the vertically shiftable slide 268, with which pin 275 there is engaged a traction spring 276 which is attached at the other end to the pin 277 provided on the stationary base plate 272.

Connecting the free lower ends of the tongues 263 and 264 is the common traction spring 307 which tends to apply the pins 280 attached to said tongues against the lower edge of the rocking plate 266 (see Fig. 15). The upper ends of tongues 263 and 264 are provided with shoulders 281 which extend alternately within the range of the key stems coordinated therewith. In the position shown in Fig. 14, which corresponds to the initial position according to Figs. 1 and 7, the shoulder 281 of the tongue 263 is in the range of the key stem 98 carrying the "0" key.

The substantially triangular rocking plate 266 is provided on its opposite side edges, in the manner shown in Figs. 14 and 15, with projecting inclined surfaces 303. When the rocking plate 266 is in the position shown in Fig. 14 and the parallel motion bar 122 is moved downwardly by depression of multiplier key such bar moves freely over the corresponding inclined edge 303. On the other hand, if the companion parallel motion bar 123 is moved downwardly by depression of a multiplier key, it engages with the oppositely projecting inclined surface 303 and rocks the plate 266 into the position shown in Fig. 15. It is to be noted, in this regard, that the rocking plate 266 is frictionally mounted on the vertically sliding plate 268 in such manner that the rocking plate 266 remains in the position to which it is shifted by the parallel motion bar 123.

When the rocking plate 266 is in the position shown in Fig. 15 and upon a succeeding depression of a multiplier key, the parallel motion bar 123 is moved downwardly, such bar moves freely over the juxtaposed surface 303. On the other hand if, in this position of the rocking plate 266, the parallel motion bar 122 is moved downwardly, the rocking plate 266 is swung back into the position shown in Fig. 14. It is clear from this, that the position, at any time, of rocking plate 266 depends upon which of the two parallel motion bars 122 or 123 was last moved downwardly. The particular position of rocking plate 266 determines whether the shoulder 281 of tongue 263 is moved within range of the stem carrying the "0" key or whether the shoulder 281 of tongue 264 lies within range of the "9" key stem.

Therefore, if the parallel motion bar 122 was last depressed, the members 266, 263, 264 will assume the positions shown in Fig. 14, and if the parallel motion bar 123 was last depressed, they will assume the positions shown in Fig. 15. When the said parts are in the positions shown in Fig. 14, then, if the "9" multiplier key is depressed, the vertically sliding plate 268 is not moved. On the other hand, if the said parts (266, 263, 264) were in the positions shown in Fig. 15, the vertically sliding plate 268 would be moved and when the "0" key is pressed, the vertically sliding plate 268 is not moved downwardly.

As shown in Figs. 7 and 14, the lower edge of the vertically sliding plate 268 overlies the free end 279 of a forwardly extending arm 278 connected to the actuating arm 207 pivoted at 208.

A link 376, whose rear end is pivoted to the outer end of the through pin 206 of the actuating arm 207, extends forwardly and is pivoted at 377 to the upper end of a tensioning arm 378 journaled on the outer end of a trip shaft 380 extending leftwardly into the adding machine casing beneath the key board thereof.

A spring link 382, one end of which is connected at 383 to the tensioning arm 378, is fastened at its opposite end to an arm 381 fast on the trip shaft 380 and normally retains a shoulder 384 of the arm 381 against the spring anchor pin 383. A trip arm 385 fast on the left hand or inner end of the trip shaft, extends upwardly to a point adjacent the arm 361 depending from the "0" adding machine key lever 359 of the "0" key 302.

It will be recalled that the "0" adding machine key 302 is effective not only to set a zero stop pin 333, but also to trip the pin carriage escapement (Figs. 3 and 5) by actuation of the escapement tripping bail 426, 427. Hence, counter-clockwise movement of the actuating arm 207 either automatically upon restoration of the thrust bar 168 and its dog 214 (Fig. 6) while the latter is engaged with the actuating slide 365, having the slot 268 accommodating the through pin 206, or manually, by pressure on the multiplier key "0" or "9" will effect a one-step advance denominationally of the pin carriage 305.

Thus the stems of the multiplier keys "0" or "9" if depressed under the above-explained conditions will contact their individual tongue 263 or 264 to depress the rocking plate 266 and with it the vertically-slidable plate 268 to rock the arm 278 and, through the foregoing connections, shift the tensioning arm 378 to tension the spring link 382 and rock the arm 381 fast on the trip shaft 380 to cause the tripping arm 385 to rock the adding machine "0" key 302 and thus effect a one-step denominational shift of the pin carriage 305 in which the multiplicand is set up, by the pressure of the operator's finger on the "0" or the "9" multiplier key.

Provided on each of the parallel motion bars 122 and 123 near their forward ends, is a downwardly extending arm 291 (see Figs. 7 and 10) to which an intercepting member 293, 293' is pivoted at 292. These intercepting members 293, 293' are provided at their upper ends with tongue-like extensions 294 and the off-set portions 262 of parallel motion bars 122 and 123 are slotted in the range of such extensions (see Figs. 10 and 11). Engaged with each lever 293 is a traction spring 295 attached at the other end, at 296, to the bar 122 or 123 and which tends to draw the tongue-like extension out of the range of the coordinated key stem and apply the upper end of the intercepting member 293 against an abutting pin 297 provided on each bar.

The lower free end of each intercepting member 293 is provided with a pin 298. These pins 298 extend into slots 299 provided at the ends of the two connecting bars 300. These two connecting bars are pivoted, respectively at their other ends by pins 301 with the arms 259 or 261 of the bell crank levers cooperating with recesses 257 formed in the catch-controlling bars 243, 244 (Fig. 16). By means of these connecting bars 300 and the controlling bars 243, 244 and the cross beam 248, the intercepting members 293, 293' are so interconnected that only the tongue-like extension 294 of one intercepting member 293, 293' will always extend into the range of its cooperating key stem. In the initial position of Fig. 1 the tongue-like extension 294 coordinated with the multiplier key "0" would thus be carried out of range of the corresponding key stem, while the other tongue-like extension 294 extends in the range of the corresponding key stem of the multiplier key "9".

Control of reversing mechanism

The reversing or shifting of the calculating mechanism, that is, its positive or negative, or additive or subtractive, connection with the type carrier and adding rack bars 330, is initiated by the two catch-controlling companion bars 243 and 244 (Fig. 16) arranged on the rear frame wall 245 connected to the side frame plate 103. These catch-controlling bars are shifted by the bell-crank arms 258 and 260 (Fig. 1). For this purpose, there is coordinated with the catch-controlling companion bars 243 and 244, a switch lever 408 (Fig. 16) pivoted at 409 to one arm of the intermediate lever 410 pivoted at 411 to ear 412 on the side frame plate 103.

The switch lever 408 is provided with two slot-like recesses 413 and 414 which open into two V-shaped openings. The pins 250 on the catch-controlling companion bars 243 and 244 are so constructed that their rear ends project into the range of movement of the switch lever 408. If the switch lever 408 is in the position shown in Fig. 16, the coordinated pin 250 occupies the recess 413 in such switch lever. Inasmuch as the catch-controlling bars 243 and 244 are still in the initial position, the intermediate lever 410 is in the position shown in Fig. 16. The end of a hanger arm 416 (see also Fig. 1a) journaled at 415 on the machine frame is contacted by the free end of the intermediate lever 410. Attached to the hanger arm 416, by rivets or the like 417, is an arm 418 having a bent end 419 which engages under the pitman 356.

If, now, the catch-controlling bars 243 and 244 are shifted from the initial position according to Fig. 16, which takes place, for example, when one of the multiplier keys "5"–"9" is depressed, the catch-controlling bar 243 is moved downwardly and the slide 244 upwardly, and at the same time, the intermediate lever 410 is swung by the switch lever 408 to rock the hanger arm in the direction of the arrow in Fig. 1. The arm 418 is thus elevated to shift the pitman 356 to such extent that its shoulder 357 passes into the range of the pin 354.

If minus multiplications are desired it is only necessary, by means of the handle 420, to swing the switch lever 408 laterally to its opposite limit of travel in which the pin 250 of the catch-controlling bar 244 is engaged by its coordinated recess 414. The handle 420 (Figs. 2 and 16) is mounted on a lever 421 journaled on pivot 422 on the frame bracket 289 and the forked end 423 of lever 421 engages the correspondingly reduced end 424 of the switch lever 408.

The operation

The operation is explained with reference to a calculating example:

12738 × 26092

The multiplicand "12738" is first set up on the keyboard 301, beginning with the digit of highest denomination, thus the "1", then the "2", the "7", then the "3" and finally the "8", by depressing the corresponding keys 301'. Then, after the repeat key "R" has been depressed and latched in the usual manner, the operator, beginning with the lowest digit, will set up the multiplier digit by digit by depressing the multiplier setting mechanism keys 97. The multiplier key designated "2" in the two key banks carried in key board plate 100 is next depressed.

By depressing key "2", the parts are carried into the position of Fig. 8 by contact of the key stem 98 with its parallel motion the bar 122. Bar 122 contacts pin 141 and lever 142 is swung downwardly which, through the catch 147, disengages the latch 111 from the stationary lower key board plate 101 to free the differential bar 107 for advance by its spring 117. The differential bar 107 is now moved by its spring 117 as far to the left as the cross extension 106 of the key stem associated with key "2" will permit. Since, in the initial position, the catch 234 is engaged with the notch 239 on differential bar 107, the U-shaped compensating bar 227 is adjusted in differential bar 107 so that the edges of its window-like openings 229 project beyond the corresponding edges of the window-like openings 118 of the differential bar.

Thus, as shown in Fig. 8, the corresponding cross extension 106 arrests the advance of the differential bar and its compensating bars 227, 228 by contact with the rear edge of a window-like opening 229 of the compensating bar 227. The advance of the differential bar 107 coordinated with key "2" is thus shortened one unit or step from three unit or step movements, so that the ratchet wheel 121, as shown in Fig. 8, is turned from the initial position in the direction of the arrow for two steps or units of movement, corresponding to this adjustment.

Simultaneously with the downward movement of the parallel motion bar 122 into the position shown in Fig. 8, the slotted link 127 is carried downwardly due to its pivotal connection with bar 122. As the arm 130 is already in its lower position with its stud 131 (Fig. 7) at the lower end of the slot 129 in the link 127, no motion is imparted by the link to the connecting arm 130.

It is to be noted that in the initial position, the switch lever 408 (Fig. 16), and intermediate lever 410 are in the position shown by full lines in Fig. 16 and thus the state control pitman 356 is in the position shown in Fig. 1a. The differential bar 107 on its advance, carries along with it the latch 111, thus withdrawing the latch pivot pin 110 (Fig. 7) from contact with the lateral extension 164 of the detent 160 whereupon the tensioned spring 161 rocks the detent counter-clockwise so that it engages its shoulder 282 over the pin 141 of the downwardly swung latch-disengaging arm 142. The key "2" is thereupon released, and its restoring spring 105 returns the depressed key towards normal position until its cross extension 106 is arrested by contact with the upper limiting edge 283 of the window-like graduated opening 118 formed in the differential bar 107. At the same time the parallel motion bar 122, through the pull of its return spring 284, will follow the key stem 98 since the bar 122 remains engaged with the lower end of the key stem. The parallel motion bar 122, on such return, withdraws from the pin 141, so that latch-disengaging arm 142 can likewise follow under the pull of the spring 144. The pin 141 engaged by the shoulder 282 of the detent 160 then carries the detent somewhat upwardly, so that the locking lever 157, on which the detent 160 is mounted, is swung into the dotted position shown in Fig. 8. The locking lever 157 then releases the motor tripping member 152, whereupon its spring 165 swings the holding pawl 154 against the ratchet wheel 121, in the position shown in Fig. 8 in dotted lines.

During the swinging movement of the motor tripping member 152, the thrust bar 168 is at the same time driven to the left in Fig. 8, into the dotted position. In this movement of the thrust bar 168, its end 370 contacts the pin 371 of the rocker 372 and swings it into the position shown in Fig. 8. In this movement, finger 374 of the rocker 372 has moved the stem 312 of the motor key 311 downwardly. Through the downward movement of stem 312, the circuit of motor 473 is closed by the members 314, 317, 318, 468 and 471 (Figs. 2, 2a). The coupling 480 and 482 is also connected so that the main drive shaft 323 is oscillated through the motor driven elements 484, 489, 492, 320 and 322.

The thrust bar 168, on its advance, carries with it the dog 214 (Fig. 6) the pin 396 on which escapes past the upper of the rear arm of the releasing bell crank 392, and snaps down in front of the shoulder 359 on the actuating slide 365. The thrust bar remains in its advanced position until the ratchet 121 effects its last return step to home position, as hereinafter explained.

In the counter-clockwise oscillation or initial stroke of the main drive shaft, in the direction of the arrow in Fig. 1, the type carrier restraining and restoring bail 336, 335 is swung upwardly, so that the type carrying bars 330 are released to the action of their springs 495 (Fig. 3) which elevate the type and rack-carrying according to the values of the corresponding digits of the multiplicand "12738" contained in the pin carriage 305.

The initial oscillation of the main drive shaft 323 causes a corresponding oscillation of the counter-shaft 329 and this causes a reciprocation of the state control pitman 356. As this pitman, as above stated, is in its lower position, as shown in Fig. 1, the totalizer reversing frame 353 is not reversed or shifted in this movement. On the downward return movement of the type-and-rack carrying bars 330, the calculating mechanism gears 448 and 456 are swung in as desribed above, so that the value set up in the pin carriage is registered once on the calculating mechanism.

In the initial stroke or oscillation of the main drive shaft 323, the link 402 (Figs. 1 and 6) swings the operating lever 405 in the direction of the arrow in Fig. 6 causing the pin 403 on the operating lever to strike the depending extension 177 of the sliding ratchet-restoring bar 174 and move it to the right from the position shown in Fig. 6, against the traction of the spring 286 (Fig. 13) engaged therewith. In this movement of the ratchet-restoring bar 174 its pawl 180 contacts the ratchet wheel 121, which in the present case is in the position shown in Fig. 8, and rotates it clockwise back for one step.

In the following complete second oscillation of the main shaft 323, the ratchet-restoring slide 174 is once more moved to the right so that its pawl 180 causes a second clockwise step rotation of the ratchet wheel 121.

Inasmuch as the ratchet wheel was previously advanced two steps or increments counter-clockwise by the differential rack bar 107, 119 upon the second oscillation of the main drive shaft 323, the pin 287 on the ratchet wheel 121 contacts a projection 290 provided on the motor tripping member 152 and return the motor tripping member to its initial position shown in Fig. 7.

By the return of the motor tripping member 152 into the initial position, the thrust bar 168 is drawn to the right back to its initial position and the pin 371 on the rocker 372 is released so that the rocker 372 may move to the position shown in Figs. 1 and 6 under the influence of the spring 317'. This has the effect of drawing the link 318 (Figs. 2, 2a) rearwardly to rock the circuit contact lever 468 and break the electric motor circuit as well as disconnect the calculating mechanism drive. During the second oscillation of the main shaft 323 the multiplicand is entered a second time into the calculating mechanism.

It is to be noted that in the return movement of the thrust bar 168 to the right, as shown in Fig. 6, the dog 214 which, in the movement to the left of the thrust bar 168, has moved in front of the shoulder 369 of the actuating slide 365, draws the slide 365 along in the direction of the arrow in Fig. 8. In this movement of the slide 365, the actuating arm 207 connected therewith by the arm 206 is rocked in the direction of the arrow in Figs. 6. The actuating arm 207 (Fig. 1) draws the link 279 rearwardly, rocking the tensioning arm 378 and through the spring link 382 rocking the arm 381 fast on the trip shaft 380. The trip shaft, in turn, rocks its trip arm 385, forcing the pin 386 of the trip arm against the depending extension 361 of the "0" adding machine key 302, to rock the "0" adding machine key lever 359 and effect a single denominational step of advance of the pin carriage 305.

It will be noted that the denominational shift of the pin carriage in which the multiplicand is represented by the set stop pins 333, occurs at the end of the digital multiplying operations.

It is also to be mentioned that, while the main drive shaft 323 is oscillated the pin 398 on the operating arm 399 (Figs. 2 and 6) first releases the corresponding arm of bellcrank lever 392, so that the bellcrank lever may rock clockwise to its idle position under the pull of the spring 394, and then upon the return stroke of the main drive shaft, the operating arm 399 contacts the forward branch of the bell crank lever 392 to return it to its normal position. When, at the end of the return stroke of the second oscillation of the main drive shaft 323, the pin 398 contacts with the corresponding arm of bellcrank lever 392, the latter is again swung into the position shown in Fig. 6. At this time, however, the thrust bar 168 and its dog 214 have returned to position the dog 214 in the path of the rear arm of the ball crank lever 392 which then engages under the pin 396 of dog 214, which is thereby raised into the position shown in Fig. 6 to release its hold on the shoulder 369 of the actuating slide 365 and the slide 365 can now snap back under the influence of the spring link 382 to the initial position shown in Fig. 6.

*Entry of second partial product of the multiplier multiplicand*

The second partial product of the multiplier times the multiplicand is now to be entered. The "9" key of the multiplier keys 97 is depressed. It is to be noted that the intercepting member 293' coordinated with the "9" key (Fig. 11) is positioned so that its tongue-like extension 294 extends into the range of the key stem 98. The key stem can not pass through the offset portion 262 but contacts with the corresponding tongue 294 and the parallel motion bar 123 is forced downwardly to depress the slotted link 128 and rock the connecting arm 135 downwardly. Prior to depression of the "9" multiplier key, the stud 134 of the connecting arm 135 lay about midway of the slot 133 in the depending link 128, so that the link had a sufficient travel to rock its connecting arm 135. The connecting arm, in turn, rocks its bell crank 260, 261 to draw the catch-controlling bar 244 upwardly and cause the finger 242 at its upper end to rise, withdrawing from the tail 240 of the compensating bar catch 237. This frees the catch to the action of its spring 235' (Fig. 19) which snaps the catch into its corresponding notch 239 in the differential bar 107, whereby to lock the compensating bar 228 to the differential bar, with the rear edges of the openings 229 of the conpensating bar 228 partially masking the openings 118 on the left hand wall of the differential bar.

The bell crank 260, 261 in rocking counter-clockwise, advanced the connecting bar 300 so as to enable the withdrawal of the tongue 294 of its intercepting member 293' from the offset 262 formed in the parallel motion bar 123.

Also, the catch-controlling bar 244, in shifting upwardly, operated through the cross beam 248 (Fig. 16) to shift the companion catch-control bar 243 downwardly to press its finger 241 on the tail of its catch 234, releasing the catch and its compensating bar 227 from engagement with the differential bar 107, so that the differential bar may advance one step before picking up the compensating bar 227.

Furthermore, the cross beam 248 as it rocks under control of the catch control bar 244 with the pin 250, shifts the switch lever 408 from its upper to its lower position, thereby rocking the intermediate lever 410, the hanger arm 416 and the extension 418 (Figs. 2, 2a) to shift the state control pitman 356 (Fig. 3) from its lower to its upper (or subtract) position.

Lastly, the catch-controlling bar 243 on its descent, rocked its bell crank lever 258 clockwise, drawing its associated connecting bar 300 rearwardly to rock its corresponding intercepting member 293 so that the tongue 294 thereof lies across the offset 262 at the forward end of the parallel motion bar 122.

In the downward movement of the parallel motion bar 123, the latch-disabling arm 142 has been rocked downwardly by contact of said bar with the pin 141 and the latch 111 is released. The differential bar 107 can thus advance to the left (Fig. 11) until the rear edge of the window-like graduated opening 118 contacts and is arrested by the cross extension 106 of the key stem. When the "9" key is pressed, the compensating bar catch 237 is raised out of notch 239 of the differential bar and through the corresponding spring 232 the U-shaped compensating bar 228 is adjusted so that its window-like graduated openings 229 are aligned with the window-like graduated openings 118 of differential bar 107. The differential bar 107 may thus move to the left for one step or unit, as is apparent from the position of the ratchet wheel 121 in Fig. 11. When the key is released, in the same manner as above described, the motor tripping member 152 will snap into the dotted line position of Fig. 8 and through the thrust bar 168, the circuit of the motor is established and the calculating mechanism connected. The calculating mechanism is reversed because of the adjustment of the state control pitman 356, upon an oscillating movement of the main shaft 323, while the multiplicand "12738" is entered negatively, that is subtracted on the calculating mechanism gears 448.

It is to be noted that in the shifting of the catch-control bars 258 and 260, as a result of the depression of the "9" multiplier key the intermediate lever 410 was moved into the dotted line position of Fig. 16, thus causing the state controlling pitman 356 to be raised, so that its shoulder 357 lies in front of the pin 354. At the beginning of the oscillating movement of the main drive shaft 323 the pitman 353 was carried into the dotted line position of Fig. 3 so that in the next movement of the calculating mechanism the reversing gears 456 are engaged with the racks 443.

During said oscillation of the main shaft 323, the ratchet-restoring 174 is moved once in the direction indicated in Fig. 6 in the manner above described, to restore the ratchet wheel 121 to the initial position shown in Fig. 7. The motor tripping member 152 is again returned to its normal position (Fig. 1) by contact of the ratchet-supported pin 287 with the arm 290 of said tripping member, which results in the return of the thrust bar 168 connected to the arm 166 of the motor tripping member, so that the motor 473 and the coupling 480 and 482 are disconnected through the rocker 372 and connected parts.

Simultaneously with the return movement of the thrust bar 168 to the right another shift movement of the pin carriage 305 is automatically brought about by means of the dog 214 and the actuating slide 365 (Figs. 1 and 6), as above described.

Entry of third partial product

The third partial product is now to be entered. The "0" is carried into the multiplier mechanism by pressing the corresponding multiplier key 97. See Fig. 10. Since shortened multiplication was performed in the second decimal position, the tongue 294 of the intercepting member 293 is in the range of the key stem 98 coordinated with the key "0". If the "0" key 97 is depressed the lower end of the key stem 98 first contacts the tongue 294 and a descending movement of the parallel motion bar 122 is initiated. On further descent to the end position in Fig. 10 the lower edge of stem 98 slides along the upper edge of the parallel motion bar 122.

Since, before depressing the "0" key, the finger 241 at the upper end of the catch-control bar 243 was in the lower position, the coordinated catch 234 was disengaged from the notch 239 of the differential bar 107, so that on release of the differential bar it can advance one step relatively to the compensating bar 227 to the position shown in Fig. 10, wherein the cross extension 106 on the key stem is contacted by the corresponding rear edge of the opening 118 which edge is substituted for the rear edge of the opening 229 in the compensating bar 227 because of the above-mentioned relative movement of the differential bar and the compensating bar, resulting in an alignment of the rear edges of the corresponding graduated openings 118 and 229 in the respective bars.

The differential bar rack 107, 119' on such one-step advance, advances the ratchet wheel 121 a single step, as shown in Fig. 10.

Depression of the "0" key, depressed the parallel motion bar 122 (Fig. 10) with its slotted link 127 to rock the connecting lever 130 and its bell crank 258 counter-clockwise. This results in a reversal of the catch-control bars 243, 244 from the positions shown in Fig. 9 to those shown in Figs. 10 and 16, that is, the catch-control bar 243 is raised to free its catch 234 for engagement with the differential bar, and, through the cross beam 248, the catch control bar 244 is lowered to disengage its catch 237 from the digit bar 107.

The pin 250 (Fig. 16) of the control bar 243 seated in the recess 413 of the switch lever 408 raises the switch lever, which, through the intermediate lever 410 and the hanger 418 allows the state controlling pitman 356 to drop, so that its lower shoulder 358 lies opposite the pin 355 of the calculator reversing frame. During the following oscillation of the main drive shaft 323 the multiplicand "12738" is entered once, positively, into the calculating mechanism. During this oscillation (of the main drive shaft 323), the ratchet wheel, which previously was moved for one step from the initial position, is again returned to the initial position as shown in Fig. 7. Therefore, the thrust bar 168 is drawn back and the rocker 372 released with a consequent breaking of the motor circuit and an uncoupling of the calculating mechanism. At the same time, by means of the dog 214 and the actuating slide 365, another step of the pin carriage 305 is brought about, so that the carriage is moved to the next higher denominational position.

Entry of fourth partial product

The fourth partial product is now entered in the calculating machine by pressing the multiplier key 97 marked "6". On depressing the "6" key the lower end of the corresponding key stem 98 (Fig. 9) strikes against parallel motion bar 123 and moves it downwardly. The differential bar 107 is thereby released in the manner previously described, so that it can advance until the rear edge of the appropriate graduated opening 118 of the differential bar contacts and is arrested by the coordinated cross extension 106.

The particular multiplier adopted in the description of the operation of this machine was selected to illustrate one instance exemplifying how the machine is organized or conditioned to operate according to any possible succession of multiplier digits.

The separation into groups of the respective multiplier digit keys "0, 1, 2, 3, 4" and "5, 6, 7, 8, 9" and the placing of reversible controls under these two groups of keys to effect additive or subtractive multiplication accordingly as a key of one group or the other is depressed, is present in Eichler, Patent No. 2,215,263 heretofore referred to, but the compensating bars 227, 228 and their controls, including the intercepting members 293, 293', by means of which this invention is able to automatically accommodate itself to any sequence of multiplier digits, and which enables a previously depressed multiplier key representing one multiplier digit of an amount to so condition the machine that it will correctly operate when the multiplier key representing the succeeding multiplier digit is depressed, irrespective of the value of such last named multiplier digit is not found in Eichler.

It will be recalled that the opposite side walls of the differential bar 107 are provided with laterally aligned and graduated openings 118, the openings on one side wall being associated with the group of multiplier keys of lower value, and the opposite series of openings 118 being associated with the group of multiplier keys of higher value. The graduated lengths of the openings are such that the groups of lower value keys "0, 1, 2, 3, 4" when depressed, would ordinarily arrest the differential bar 107 after the latter has advanced "one, two, three, four or five" steps, respectively, which, obviously, would be incorrect in ordinary additive multiplication. Similarly, the group of higher value keys "5, 6, 7, 8, 9" associated with the graduated series of openings 118 in the opposite or left hand side wall of the differential bar would, upon depression, arrest the differential bar 107 after advances of "five, four, three, two and one" steps, respectively, which would result in an incorrect product in ordinary negative multiplication.

Therefore, the two compensating bars 227, 228 are provided for the respective series of graduated openings 118, said compensating bars having graduated openings 229 formed therein, duplicating the openings 118, said compensating bars being adjustable relatively to the differential bar so that in one position the openings 229 in the compensating bars register with their associated openings 118 in the differential bar, and in the other adjusted position of the compensating bars, the openings 229 restrict the graduated openings 118 equally by one step or increment of movement.

Obviously, in the latter adjustment, the advance of the differential bar 107 under control of the multiplier keys of lower value, would be consonant with the values of such keys, as is proper in ordinary additive multiplication.

And under such restrictive or limiting adjustment of the compensating bar 228 relatively to the differential bar, when the advance of the latter is controlled by the group of multiplier keys of higher order, such advance corresponds to the "nines" complements of the values of such higher group of multiplier keys which is ordinarily the proper method in performing subtractive or shortened multiplication.

But the presence of "9's" and "0's" in the multiplier necessitates the provision of means which will operate to multiply by "ten" in case a multiplier digit of the higher order (5, 6, 7, 8, 9) precedes the instant multiplier digit "9" or in the event a multiplier digit of lower order (0, 1, 2, 3, 4) precedes the instant multiplier digit "0".

In the example "12738×26092" it is seen that the digits of the multiplier alternate, that is, a digit of the lower group is succeeded by a digit of the higher group, and vice versa, and from the description thus far outlined, it is obvious that while depression of the successive multiplier keys representing the digits of the multiplier (where such succeeding digit is of a different group from the preceding digit) will shift the state control, they merely condition the compensating bars for reversal on the next operation, because the differential bar is tripped prior to the reversal of the catch-controlling bars 243, 244.

Therefore, since the machine is always conditioned for additive multiplication prior to starting a multiplying operation, the compensating bar 227 associated with the multiplier keys of lower order is in effective position relatively to the differential bar 107 and serves to limit the advance of such differential bar to increments of movement corresponding to the values of the lower value group of keys, whereas the compensating bar 228 associated with the higher value group of keys is normally ineffective relatively to the differential bar.

As a result, if the lowest denominational or units digit of the multiplier is of the lower group, the ensuing multiplying operation will be effected by repeated addition a number of times corresponding with the value of the lower value key depressed.

But if the units digit of the multiplier is of the higher value group, depression of the corresponding key will positively effect a reversal of the state control pitman 356 to subtraction, but will merely set the catch-control bars 243, 244 and the catches 234, 237 so that, in case the next following multiplier digit is of the higher value group, the compensating bar 228 will be connected with the differential bar. However, the compensating bar 227 will have been disconnected from the differential bar.

The ensuing operation, under control of the units multiplier key of higher order depressed, will result in an over-subtraction of the multiplicand once, which must be compensated for when the next multiplier digit of the lower order group is reached, or by a depression of the "0" multiplier key in case there is no succeeding digit of lower order in the multiplier.

This compensation is effected when a multiplier key of the lower order group is depressed, by delaying the connection of the compensating bar 227 to the differential bar until the end of the cycling of the machine. In other words, ten times the multiplier is added once to the partial product of the over-subtraction. This result is obtained by enabling the differential bar to advance one step in the event that the multiplier digit of lower value is a "0", or where the multiplier digit is "1", "2", "3" or "4", by enabling the differential bar to advance one step or increment of movement in addition to the value of the depressed key.

Returning, now, to the description of the operation, it will be recalled that upon depressing the preceding multiplier key "0" as explained in connection with the above-description of the entry of the third partial product, the catch-control bars 243, 244 were shifted to the positions shown in Fig. 16, to shift the state control pitman 356 from subtraction to addition, and to reverse the compensating bar catches 234, 237 to disconnect the compensating bar 228 from the differential bar 107 and to condition the catch 234 so as to engage the compensating bar 227 with the differential bar when the latter was restored to its home position at the end of the machine cycle.

Depression of the "6" multiplier key again reverses the catch control bars 243, 244 to positively set the state control pitman 356 back to subtractive position and to positively disengage the catch 234 from its compensating bar 227, with which it had just been engaged at the end of the previous cycle.

Also this reversal of the controls conditions the catch 237 for connecting its compensating bar 228 with the differential bar 107, which is of importance if the succeeding multiplier digit is of the same value group, but since the differential bar 107 has already advanced before the catch 237 can engage its notch 239 in the differential bar, the catch 237 remains ineffective during the entry of this partial product.

Therefore, the differential bar 107 advances one step before picking up the ineffective compensating bar 228, and continues its advance until arrested by contact of the rear wall of the graduated opening 118 with which the "6" key stem is associated, or a distance of four steps or increments of movement, and in so doing, has rotated the ratchet wheel 121 four steps in counter-clockwise direction. The compensating bar 228 lies with the rear edges of its openings 229 in register with the rear edges of the openings 118 in the differential bar.

In the consequent four oscillations of the main shaft 323 (corresponding to the four steps of advance of the wheel 121) the multiplicand "12738" increased ten-fold for each denominational advance is subtracted four times at the corresponding denominational position from the amount registered on the calculating mechanism gears 448 and 456. During the fourth oscillation of the main drive shaft 323 the ratchet wheel reaches its initial position as shown in Fig. 7 and the thrust bar 168 is again moved to the right into its initial position. This, in turn, results in the disconnection of the electric motor 473 and the clutch 480, 482. In the return of thrust bar 168, the pin carriage 305 is shifted a step by the dog 214 and the actuating slide 365.

*Entry of fifth partial product*

Figure 12:
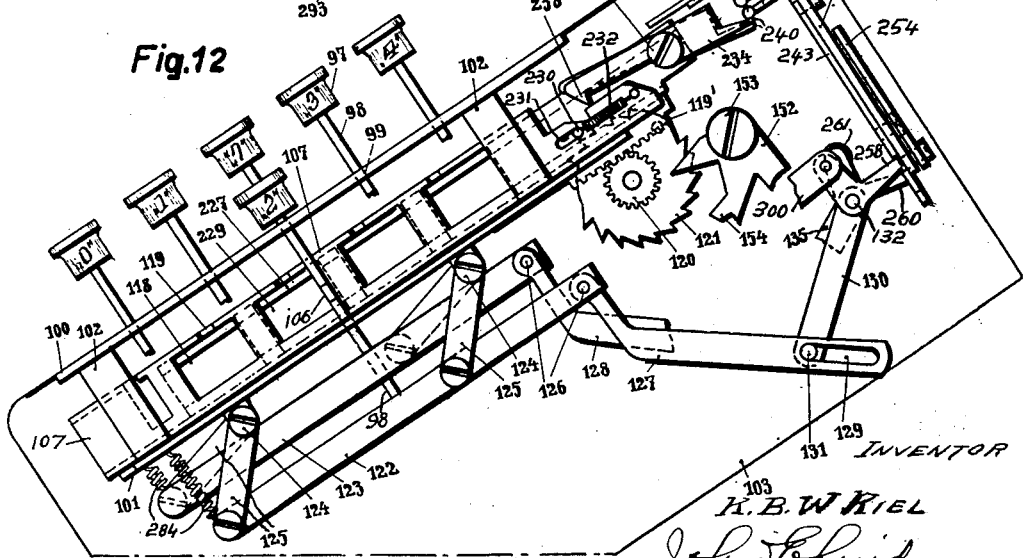
Figure 12 is also a view similar to Figure 7 with parts omitted for greater clarity, illustrating the positions taken by some of the elements when the multiplier setting key "2" is depressed with the controls however in a different position from that shown in Figure 8.

If, now, the multiplier key 97 marked "2" is pressed for the fifth denominational digit of the multiplier, the parts assume the position shown in Fig. 12. As the catch 234 coordinated with the compensating bar 227 is in the raised or disengaged position, the differential bar 107, in contrast to the position according to Fig. 8, can move to the left for three steps. The main shaft will, therefore, describe three oscillations before the thrust bar 168 is returned to its home position at the right and the rocker 372 is shifted by the spring 317' to disconnect the motor 473 and the coupling 480, 482. As the slotted link 127 is carried downwardly on depressing the multiplier key 97 marked "2", the bell crank operating levers 130 and 135 are shifted so that the switch lever 408 and the intermediate lever 410 again assume the position shown in Fig. 16 in full lines. The hanger arm 418 thus releases the pitman 356, so that its shoulder 358 lies in front of pin 355 of the calculator reversing frame 353. In the first counter-clockwise movement of main shaft 323 the calculating mechanism gears 448, 456 are carried into the plus or positive position, so that during the three oscillations of the main drive shaft 323 the multiplicand increased tenfold due to the previous advance of the pin carriage, is entered additively three times into the corresponding denominational gears 448 of the totalizer.

The calculation is then terminated and the calculating mechanism contains the result 332,359,896

By actuating the total or subtotal keys 308 or 309 this result can be transferred to the type bars and printed on the strip 341.

The adding machine has thus done the following: first, the multiplicand "12738" was entered twice, positively, into the calculating mechanism. After an automatic one step advance of the pin carriage 305 into the next higher decimal position the multiplicand increased ten-fold was introduced once into the calculating mechanism subtractively. After a further one step of the pin carriage into the next higher decimal position the multiplicand again increased ten-fold, was entered positively into the calculating mechanism. This done, the pin carriage made a further one step movement into the next higher decimal position, in which the multiplicand increased ten-fold a third time, was then introduced four times into the calculating mechanism. Finally, after another step movement of pin carriage 305 into the next higher decimal position the multiplicand increased ten-fold a fourth time, was added three times in the calculating mechanism. The calculation was thereby terminated and it was completed with eleven oscillations of the main shaft 323.

| | | |
|---|---|---|
| 1st cycle | 12738 + | "2" |
| 2nd cycle | 12738 + | |
| Pin carriage shift | | |
| Register shows | 000025476 | |
| 3rd cycle | 127380 − | "9" |
| Pin carriage shift | | |
| Register shows | 999898096 | |
| 4th cycle | 1273800 + | "0" |
| Pin carriage shift | | |
| Register shows | 001171896 | |
| 5th cycle | 12738000 − | |
| Register shows | 988433896 | |
| 6th cycle | 12738000 − | "6" |
| Register shows | 975695896 | |
| 7th cycle | 12738000 − | |
| Register shows | 962957896 | |
| 8th cycle | 12738000 − | |
| Register shows | 950219896 | |
| Pin carriage shift | | |
| 9th cycle | 127380000 + | |
| Register shows | 077599896 | "2" |
| 10th cycle | 127380000 + | |
| Register shows | 204979896 | |
| 11th cycle | 127380000 + | |

Register shows 332359896

In the calculating example here involved the multiplier figure last keyed is a "2". For this the machine operates normally, that is, not with short cut multiplication. In order to prevent incorrect calculation when the highest multiplier figure is above "4", it is necessary to depress the multiplier key designated "0". In order to avoid error, it is preferable for the operator, always at the termination of the calculation, that is, after he has fully keyed the multiplier and printed the result, to depress the zero multiplier key.

It is to be understood that the invention above described is not limited to "Astra" machines and may be embodied in other makes of adding machines and is capable of various modifications.

I claim:

1. In a calculating machine having an algebraic accumulator, differential actuators therefor, settable means for controlling positive or negative actuation of said accumulator by said actuators comprising a rocking frame carrying said accumulator, a settable lever operable to rock said frame and means operable to move said lever, when set, to rock said frame and a multiplier control unit comprising two sets of keys; a control linkage between said control unit and said settable means comprising a pivotally mounted lever, a setting plate pivotally connected to one free end of said pivotally mounted lever, means operable by the other free end of said pivotally mounted lever for setting said settable means for positive or negative actuation of said accumulator, a slidingly mounted bar operable by the keys of one of said sets of keys for moving said setting plate to pivot said pivotally mounted lever to set said settable means for positive actuation of said accumulator and a second slidingly mounted bar connected to said first mentioned bar operable by the keys of the other set of keys for moving said setting plate to pivot said pivotally mounted lever to set said settable means for negative actuation of said accumulator.

2. In an adding machine, having a totalizer; numeral keys; differential mechanism to enter amounts on the totalizer; indexing mechanism selectively set by the keys to control the differential mechanism; state control means to determine whether amounts shall be entered additively or subtractively on the totalizer; means to retain an amount set up in the indexing mechanism; and means to effect relative movement between the indexing mechanism and the totalizer; the combination of means to effect multiplication by a shortened method on the adding machine, including multiplier digit keys arranged in groups; a differential member variously arrested by the selectively depressed multiplier keys after advancing numbers of steps corresponding to one notational system; compensating members between which and the differential member there is relative adjustment, and coacting with the selectively depressed multiplier keys in one of said adjustments to arrest the differential member after it advances numbers of steps according to a different notational system; means determined by the multiplier key previously depressed to condition the multiplication means for operation according to either notational system; means controlled by the differential member to determine the number of times the multiplicand shall be entered in the totalizer; means controlled by the respective groups of multiplier keys to determine whether such entries shall be additive or subtractive; and means to automatically shift the denominational relation of the indexing mechanism and the totalizer responsive to the depression of the multiplier keys.

3. The combination in an adding machine having an indexing mechanism; a totalizer; of means to enable the machine to perform multiplication by a shortened method, including a plurality of multiplier keys representing the cardinal digits from "0" to "9", arranged in two groups; a differential bar having progressively spaced stops, each associated with its individual multiplier key; compensating bars shiftable relatively to each other and to the differential bar, and adjustable relatively to the stops of the differential bar to to occupy masking positions relatively to the stops effective to reduce the extent of advance of the differential bar by a constant amount for each multiplier key, whereby to arrest the advance of said differential bar short of the full extent to which the differential bar may advance when the compensating bars are ineffective to mask the differential bar stops; means to releasably latch either compensating bar in effective relation with the differential bar; and means operable by the respective groups of multiplier keys to determine the effectiveness and ineffectiveness of the respective compensating bars.

4. The combination in an adding machine having an indexing mechanism; a totalizer; of means to enable the machine to perform multiplication by a shortened method, including a plurality of multiplier keys representing the cardinal digits from "0" to "9", arranged in two groups; a differential bar having progressively spaced stops, each associated with its individual multiplier key; compensating bars shiftable relatively to each other and to the differential bar, and adjustable relatively to the stops of the differential bar to occupy masking positions relatively to the stops effective to reduce the extent of advance of the differential bar by a constant amount for each multiplier key, whereby to arrest the advance of said differential bar short of the full extent to which the differential bar may advance when the compensating bars are ineffective to mask the differential bar stops; means to releasably latch either compensating bar in effective relation with the differential bar; means operable by the respective groups of multiplier keys to determine the effectiveness and ineffectiveness of the respective compensating bars; and intercepting means shiftable alternately into and out of the paths of the "0" and "9" multiplier keys in response to the latching and release of the compensating bars with which the "0" and "9" multiplier keys are respectively associated, the intercepting means for the "0" key being effective coincidently with the effectiveness of the compensating bar with which the "9" key is associated and vice versa, to enable the "0" and "9" keys to control the advance of the differential bar.

5. The combination in an adding machine having an indexing mechanism; a totalizer; means for relatively shifting the indexing mechanism and totalizer denominationally; including an escapement; and state control means to determine whether the amount set up in the indexing mechanism shall be additively or subtractively entered in the totalizer; of means to enable the machine to perform multiplication according to a shortened method, including a plurality of multiplier keys representing the cardinal digits from "0" to "9", arranged in two groups; a differential bar to regulate the number of machine cycles under the control of the multiplier key depressed, and having progressively arranged stops individual to the respective keys, and with which the keys coact to variously arrest the differential member on its advance; compensating stop means carried by and having a limited movement relatively to the differential bar equal to one unit of travel of the differential bar, said compensating stop means when in effective position, operating to restrict the advance of the differential bar by one unit of travel; latching means individual to and controlled by the respective groups of multiplier keys to determine whether the compensating stop means shall be effective or ineffective; means common to the respective groups of multiplier keys and controlled by said groups of keys incident to the control of the compensating stop means to determine whether the machine shall operate additively or subtractively; intercepting means individual to the "0" and "9" multiplier keys and alternately settable to determine whether or not said "0" and "9" keys shall control the compensating stop means and the state control means; and means operable by said "0" and "9" keys to trip the escapement mechanism when, because of the adjustment of its corresponding intercepting number, the corresponding key is deprived of its control of the compensating stop means and the state control mechanism.

6. The combination in an adding machine having an indexing mechanism; a totalizer; means for relatively shifting the indexing mechanism and the totalizer denominationally, including an escapement mechanism; and state control means to determine whether the amount set up in the indexing mechanism shall be entered in the totalizer additively or subtractively; of means to enable the machine to perform multiplication according to a shortened method, including a plurality of multiplier keys arranged in groups; means controlled by the respective groups of multiplier keys to determine the number of times the multiplicand set up on the indexing mechanism shall be entered on the totalizer additively or subtractively depending upon the value of the multiplier key depressed; intercepting means to render the "0" and the "9" multiplier keys effective or ineffective to control the additive or subtractive operation of the machine; and means controlled by said "0" and "9" multiplier keys to trip said escapement by pressure on said keys, including tongues individual to the respective "0" and "9" keys and shiftable into and out of effective position relatively to their keys; a support for said tongues shiftable by depression of either of said keys to enter the corresponding tongue into the path of the depressed key for operation by the same key on a succeeding operation and to displace the companion tongue out of the path of the undepressed key; and a slide on which the shiftable support is mounted, said slide adapted to trip the escapement when actuated by the engagement of either key with its tongue upon depression of said key.

7. The combination in an adding machine having an indexing mechanism; a totalizer; means to relatively shift the indexing mechanism and totalizer denominationally; and state control means to determine whether the amount indexed shall be entered additively or subtractively in the totalizer; of means to enable the machine to perform multiplication by a shortened method, including a plurality of multiplier digit keys, grouped according to the higher and lower values of the digits thereof; a differential bar, the number of advance steps of which is controlled by the multiplier keys in accordance with the values of the multiplier keys of lower values plus one step, and in accordance with the "tens" complements of the multiplier keys of higher value; compensating members respectively individual to the groups of multiplier keys and shiftable relatively to each other and to the differential bar, into and out of effective position relatively to the differential bar, said compensating members, when in their effective positions, operable to restrict the step advances of the differential bar to correspond with the values of the respective keys of the lower value group; and to the "nines" complements of the values of the respective keys of the higher value group; latching means to releasably couple one or the other of the compensating members to the differential bar while in effective relation thereto; means responsive to the operation of the keys in the respective groups of multiplier keys to determine which of the compensating bars shall remain effective while the other is ineffective, said responsive means also operative to determine whether the machine shall enter amounts in the totalizer additively or subtractively; and intercepting means individual to and alternately shiftable under control of said responsive means, into and out of effective relation with the "0" and "9" multiplier keys, respectively, to neable said "0" and "9" keys to operate said responsive means.

KARL BERTHOLD WILHELM KIEL.